(12) United States Patent
Gopalan et al.

(10) Patent No.: US 9,133,950 B2
(45) Date of Patent: Sep. 15, 2015

(54) ROTARY SERVO PULSER AND METHOD OF USING THE SAME

(71) Applicant: RIME Downhole Technologies, LLC, Fort Worth, TX (US)

(72) Inventors: Manoj Gopalan, Dalworthington Gardens, TX (US); Robert Arthur Weber, Fort Worth, TX (US)

(73) Assignee: Rime Downhole Technologies, LLC, Fort Worth, TX (US)

( * ) Notice: Subject to any disclaimer, the term of this patent is extended or adjusted under 35 U.S.C. 154(b) by 307 days.

(21) Appl. No.: 13/747,315

(22) Filed: Jan. 22, 2013

(65) Prior Publication Data

US 2014/0124693 A1        May 8, 2014

Related U.S. Application Data

(60) Provisional application No. 61/723,713, filed on Nov. 7, 2012.

(51) Int. Cl.

| E21B 43/00 | (2006.01) |
|---|---|
| E21B 34/06 | (2006.01) |
| E21B 21/08 | (2006.01) |
| E21B 21/10 | (2006.01) |

(Continued)

(52) U.S. Cl.
CPC .............. *F16K 27/00* (2013.01); *E21B 47/182* (2013.01); *E21B 47/187* (2013.01); *F16K 27/045* (2013.01); *E21B 34/00* (2013.01)

(58) Field of Classification Search
CPC ...... E21B 34/00; F16K 11/074; F16K 27/045

USPC ............... 166/330; 175/38; 251/58, 286, 288, 251/129.11, 129.12

See application file for complete search history.

(56) References Cited

U.S. PATENT DOCUMENTS

| 304,751 A | * | 9/1884 | Poor ........................ 137/625.31 |
|---|---|---|---|
| 534,751 A | * | 2/1895 | Melavin ........................ 251/181 |

(Continued)

OTHER PUBLICATIONS

RIME Downhole Technologies, LLC; PCT/US2013/000254 (filed Nov. 7, 2013); Invitation to Pay Additional Fees and, Where Applicable, Protest Fee (PCT/ISA/206) (dated May 21, 2014, available May 21, 2014), 2 pp.

(Continued)

*Primary Examiner* — John K Fristoe, Jr.
*Assistant Examiner* — Seth W Mackay-Smith
(74) *Attorney, Agent, or Firm* — Timothy G. Ackermann

(57) ABSTRACT

A servo pulser used to actuate a pulser valve and create pressure pulses in downhole measurement while drilling tools is described. An electric gearmotor is used to rotate a shaft which in turn operates a servo valve. A facing portion of the shaft is compressed onto the face of a servo seat having passages connected to the inside of a drill collar and the rotating action is used to open and/or obstruct a fluid path through those passages. The shaft may include wear-resistant tips to obstruct the fluid path. Part of the torque-transmitting apparatus between the gearmotor and the shaft can be hydrostatically compensated, and part sealed against the operating environment. A magnetic torque coupler may be used as part of the torque-transmitting apparatus between the gearmotor and the shaft. The servo pulser is coupled to a pulser valve, a power source and a sensor package all of which reside inside a short section of drill pipe near the bottom of well bore being drilled.

91 Claims, 22 Drawing Sheets

(51) Int. Cl.
*F16K 31/04* (2006.01)
*F16K 51/00* (2006.01)
*F16K 27/00* (2006.01)
*F16K 27/04* (2006.01)
*E21B 47/18* (2012.01)
*E21B 34/00* (2006.01)

(56) References Cited

U.S. PATENT DOCUMENTS

| | | | |
|---|---|---|---|
| 557,943 A * | 4/1896 | Bayley et al. | 251/110 |
| 1,906,266 A * | 5/1933 | Hoffman | 251/286 |
| 2,253,643 A * | 8/1941 | Mueller | 251/286 |
| 2,583,869 A * | 1/1952 | Monson | 251/286 |
| 2,700,131 A | 1/1955 | Otis | |
| 2,759,143 A | 8/1956 | Arps | |
| 2,979,076 A * | 4/1961 | Kish | 137/382 |
| 3,065,416 A | 11/1962 | Jeter | |
| 3,081,792 A * | 3/1963 | Hansen | 137/454.2 |
| 3,309,656 A | 3/1967 | Godbey | |
| 3,698,418 A * | 10/1972 | Schmitt | 137/315.13 |
| 3,958,217 A | 5/1976 | Spinnler | |
| 4,351,037 A | 9/1982 | Scherbatskoy | |
| 4,630,244 A | 12/1986 | Larronde | |
| 4,637,479 A * | 1/1987 | Leising | 175/26 |
| 4,753,418 A * | 6/1988 | Brotcke | 251/288 |
| 4,785,300 A | 11/1988 | Chin et al. | |
| 4,794,944 A * | 1/1989 | Henry | 137/312 |
| 4,847,815 A | 7/1989 | Malone | |
| 4,979,577 A | 12/1990 | Walter | |
| 5,010,917 A * | 4/1991 | Iqbal | 137/454.6 |
| 5,333,686 A | 8/1994 | Vaughan et al. | |
| 6,016,288 A | 1/2000 | Frith | |
| 6,714,138 B1 | 3/2004 | Turner et al. | |
| 7,108,006 B2 * | 9/2006 | Armstrong | 137/14 |
| 7,327,634 B2 | 2/2008 | Perry et al. | |
| 7,468,679 B2 | 12/2008 | Feluch | |
| 7,719,439 B2 | 5/2010 | Pratt et al. | |
| 7,735,579 B2 * | 6/2010 | Gopalan et al. | 175/40 |
| 2006/0131030 A1 * | 6/2006 | Sheffield | 166/374 |
| 2009/0072179 A1 * | 3/2009 | Swartzentruber et al. | 251/249.5 |
| 2010/0157735 A1 | 6/2010 | Allan | |
| 2010/0212963 A1 | 8/2010 | Gopalan | |
| 2011/0056695 A1 * | 3/2011 | Downton | 166/330 |
| 2012/0273271 A1 * | 11/2012 | Stuart-Bruges | 175/38 |

OTHER PUBLICATIONS

RIME Downhole Technologies, LLC; PCT/US2013/000254 (filed Nov. 7, 2013); International Search Report (PCT/ISA/210) (mailed Aug. 15, 2014, published Oct. 23, 2014), 5 pp.

RIME Downhole Technologies, LLC; PCT/US2013/000254 (filed Nov. 7, 2013); Written Opinion of the International Search Authority (PCT/ISA/237) (mailed Aug. 15, 2014), 10 pp.

* cited by examiner

ROTARY SERVO PULSER AND METHOD OF USING THE SAME

FIELD OF INVENTION

Figure 1A:
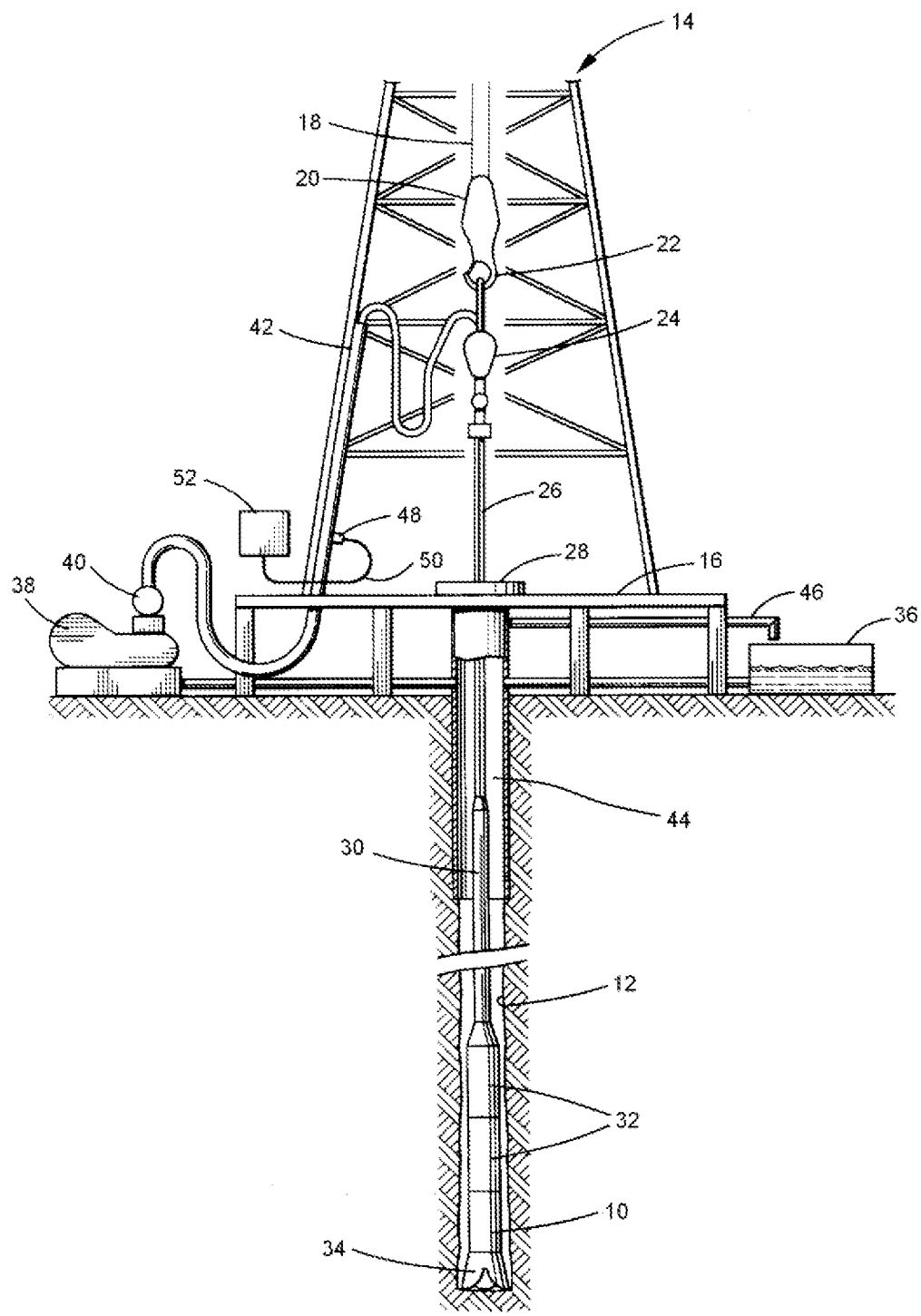
FIG. 1A is a representative view of parts of the surface and downhole portions of a drilling rig.

In general, the present invention relates to a device, system or method including a rotary servo valve for actuating a pulser for generating pressure pulses in a fluid column during the process of drilling a subterranean borehole with the intent of using said pressure pulses to encode information and telemeter such information to the surface in real time.

BACKGROUND OF INVENTION

In the drilling of deep boreholes, the rotary drilling technique has become a commonly accepted practice. This technique involves using a drill string which consists of numerous sections of hollow pipe connected together and to the bottom end of which a drill bit is attached. By imparting axial forces onto the drilling bit and by rotating the drill string either from the surface or using a hydraulic motor attached to the drill string, a reasonably smooth and circular borehole is created. The rotation and compression of the drilling bit causes the formation being drilled to be crushed and pulverized. Drilling fluid is pumped down the hollow center of the drill string through nozzles on the drilling bit and then back to the surface around the annular space between the drill string and the borehole wall. This fluid circulation is used to transport the cuttings from the bottom of the borehole to the surface where they are filtered out and the drilling fluid is recirculated as desired. The flow of the drilling fluid also carries out other functions such as cooling and lubricating the drilling bit cutting surfaces and exerts a hydrostatic pressure against the borehole walls to help contain any entrapped gases that are encountered during the drilling process.

The need to measure certain parameters at the bottom of a borehole and provide this information to the driller has long been recognized. These parameters include, but are not limited to the temperature, pressure, inclination and direction of the borehole, and can include various geophysical and lithological measurements. The challenge of measuring these parameters in the hostile environment at the bottom of a borehole during the drilling process and conveying this information to the surface in a timely fashion has led to the development of many devices and practices.

It is an advantage to have the ability to send data from the bottom of a bore well to the surface, while drilling and without the use of wires or cables and without the repeated interruption of drilling activity. Tools that have the above ability are commonly referred to as "measurement while drilling" or "MWD" tools. Pressure pulses in the drilling fluid may be used to encode and transmit data to the surface of the earth from an MWD tool at the bottom of a borehole.

There are a variety of different measured parameters that may be transmitted to the driller. These range from the simplest measurement of the temperature at the bottom of the borehole to fully integrated products that provide a full range of measurements including but not limited to inclination, azimuth, toolface (rotational orientation of the drill string), pressures, temperatures, vibration levels, formation geophysical properties such as resistivity, porosity, permeability, density and insitu formation analysis for hydrocarbon content.

Due to the harsh nature of the downhole drilling environment, MWD tools necessarily have to be robust in design and execution. In addition, the constant flow of drilling fluid through or past the MWD tool causes significant erosion of exposed components and can cause significant damage to tools if improperly designed or operated.

It is understood that the term "drilling fluid" or "mud" is used here to represent an extremely wide variety of water or oil based liquids of varying densities, viscosities and contaminant content. The need to keep the borehole hydrostatic pressures high in order to contain or reduce the risk of a gas pocket from escaping the bore well results in the drilling fluid being weighted with additives to increase its density. These additives often tend to be abrasive in nature and further exasperate the erosion problems associated with the flow of the fluid past the tool.

In addition, the need to preserve and maintain the quality of the bore well and to prevent or reduce the risk of the bore well caving in, other filler materials are added to the drilling fluid to aid in bonding the bore well walls. These filler materials tend to be granular in nature and clog or cover inlet and outlet ports, screens and other associated hydraulic components that are part of most MWD tools.

Further, the extreme temperatures and pressures that are present in the bottom of the bore well often necessitate the use of expensive and exotic sealing mechanisms and materials, which increase the costs of operating the MWD tools, and thereby reduce their usability to the wider market place.

Still furthermore, due to the high costs associated with drilling oil and gas boreholes, any time that is spent repairing, maintaining or servicing failed or nonfunctional equipment results in a severe reduction in the productivity of the whole drilling operation. As such, MWD tools have always needed to be designed, built and operated with a need for high quality and reliability.

Thus, an important goal in the design of MWD tools is to provide a pulse generator which can operate reliably in the hostile environment produced by the exposure to drilling mud and other downhole conditions.

SUMMARY OF THE INVENTION

The present invention includes a rotary servo valve assembly that is used to actuate a large main valve assembly or pulser which in turn creates mud pulses that are used to encode and transmit data to the surface.

An embodiment of the invention is a method and apparatus used to actuate a main pulser valve that is used to transmit information to the surface from a subsurface location during the process of drilling a borehole. A rotary servo pulser is coupled to a pressure pulse generator or "pulser", a controller and a battery power source all of which reside inside a short section of drill pipe close to the bit at the bottom of the borehole being drilled. The assembled apparatus or "MWD tool" can be commanded from the surface to make a measurement of desired parameters and transmit this information to the surface. Upon receiving the command to transmit information, the downhole controller gathers pertinent data from a sensor package and transmits this information to the surface by encoding data in pressure pulses. These pressure pulses travel up the fluid column inside the drill pipe and are detected at the surface by a pressure sensitive transducer coupled to a computer which decodes and displays the transmitted data.

An embodiment of the invention comprises a system for actuating a pulser and telemetering information to the surface from a subsurface location, and may more specifically comprise a main pulser valve, a rotary servo pulser, a controller assembly and a power source assembly. The method may comprise operating an electric motor to operate the rotary servo pulser to actuate the pulser to carry the information via the pressure pulses.

An embodiment of the invention is a valve including a valve seat and a rotating portion driven by a shaft. The rotating part includes structures to obstruct flow through the valve seat. The structures may extend off of the rotating part to contact the valve seat. More than one fluid path may be provided through the servo pulser, such as by two holes in the valve seat, which may be circular, and may be symmetrical about the axis around which the rotating part rotates. The rotation of the rotating part may be limited by one or more stops. The stops may be formed on a structure supporting the valve seat or as a separate structure from the valve seat. The stops may be rotationally-fixed with respect to the fluid path, or in one embodiment, the valve seat, and be indirectly in contact with that seat. The valve seat and flow-obstructing structures may be hard and/or wear- and abrasion-resistant. The shaft, stops, supporting structure, and rotating part may be non-brittle, and shock- and vibration-resistant. Rotating the servo pulser may include transmitting torque, such as from a gearmotor, through a pressure-compensated section or using a magnetic torque-transmitting device to a shaft operating a servo valve.

DETAILED DESCRIPTION

In one embodiment of the invention, as described in detail below, information of use to the driller is measured at the bottom of a borehole relatively close to the drilling bit and this information is transmitted to the surface using pressure pulses in the fluid circulation loop. The command to initiate the transmission of data is sent by stopping fluid circulation and allowing the drill string to remain still for a minimum period of time. Upon detection of this command, the downhole tool measures at least one downhole condition, usually an analog signal, and this signal is processed by the downhole tool and readied for transmission to the surface. When the fluid circulation is restarted, the downhole tool waits a predetermined amount of time to allow the fluid flow to stabilize and then begins transmission of the information by repeatedly closing and then opening the pulser valve to generate pressure pulses in the fluid circulation loop. The sequence of pulses sent is encoded into a format that allows the information to be decoded at the surface and the embedded information extracted and displayed.

Referring now to the drawings and specifically to FIG. 1A, there is generally shown therein a simplified sketch of the apparatus used in the rotary drilling of boreholes 12. A borehole 12 is drilled into the earth using a rotary drilling rig which consists of a derrick 14, drill floor 16, draw works 18, traveling block 20, hook 22, swivel joint 24, kelly joint 26 and rotary table 28. A drill string 30 used to drill the bore well is made up of multiple sections of drill pipe that are secured to the bottom of the kelly joint 26 at the surface and the rotary table 28 is used to rotate the entire drill string 30 while the draw works 18 is used to lower the drill string 30 into the borehole and apply controlled axial compressive loads. The bottom of the drill string 30 is attached to multiple drilling collars 32, which are used to stiffen the bottom of the drill string 30 and add localized weight to aid in the drilling process. A measurement while drilling (MWD) tool 10 is generally depicted attached to the bottom of the drill collars 32 and a drilling bit 34 is attached to the bottom of the MWD tool 10.

The drilling fluid or "mud" is usually stored in mud pits or mud tanks 36, and is sucked up by a mud pump 38, which then forces the drilling fluid to flow through a surge suppressor 40, then through a kelly hose 42, and through the swivel joint 24 and into the top of the drill string 30. The fluid flows through the drill string 30, through the drill collars 32, through the MWD tool 10, through the drilling bit 34 and its drilling nozzles (not shown). The drilling fluid then returns to the surface by traveling through the annular space 44 between the outer diameter of the drill string 30 and the well bore 12. When the drilling fluid reaches the surface, it is diverted through a mud return line 46 back to the mud tanks 36.

The pressure required to keep the drilling fluid in circulation is measured by a pressure sensitive transducer 48 on the kelly hose 42. The measured pressure is transmitted as electrical signals through transducer cable 50 to a surface computer 52 which decodes and displays the transmitted information to the driller.

In some drilling operations, a hydraulic turbine (not shown) of a positive displacement type may be inserted between the MWD tool 10 drill collar 32 and the drilling bit 34 to enhance the rotation of the bit 34 as desired. In addition, various other drilling tools such as stabilizers, one way valves and mechanical shock devices (commonly referred to as jars or agitators) may also be inserted in the bottom section of the drill string 30 either below or above the MWD tool 10. Some of these components could be used in the process of directionally drilling the well.

Figure 1B:
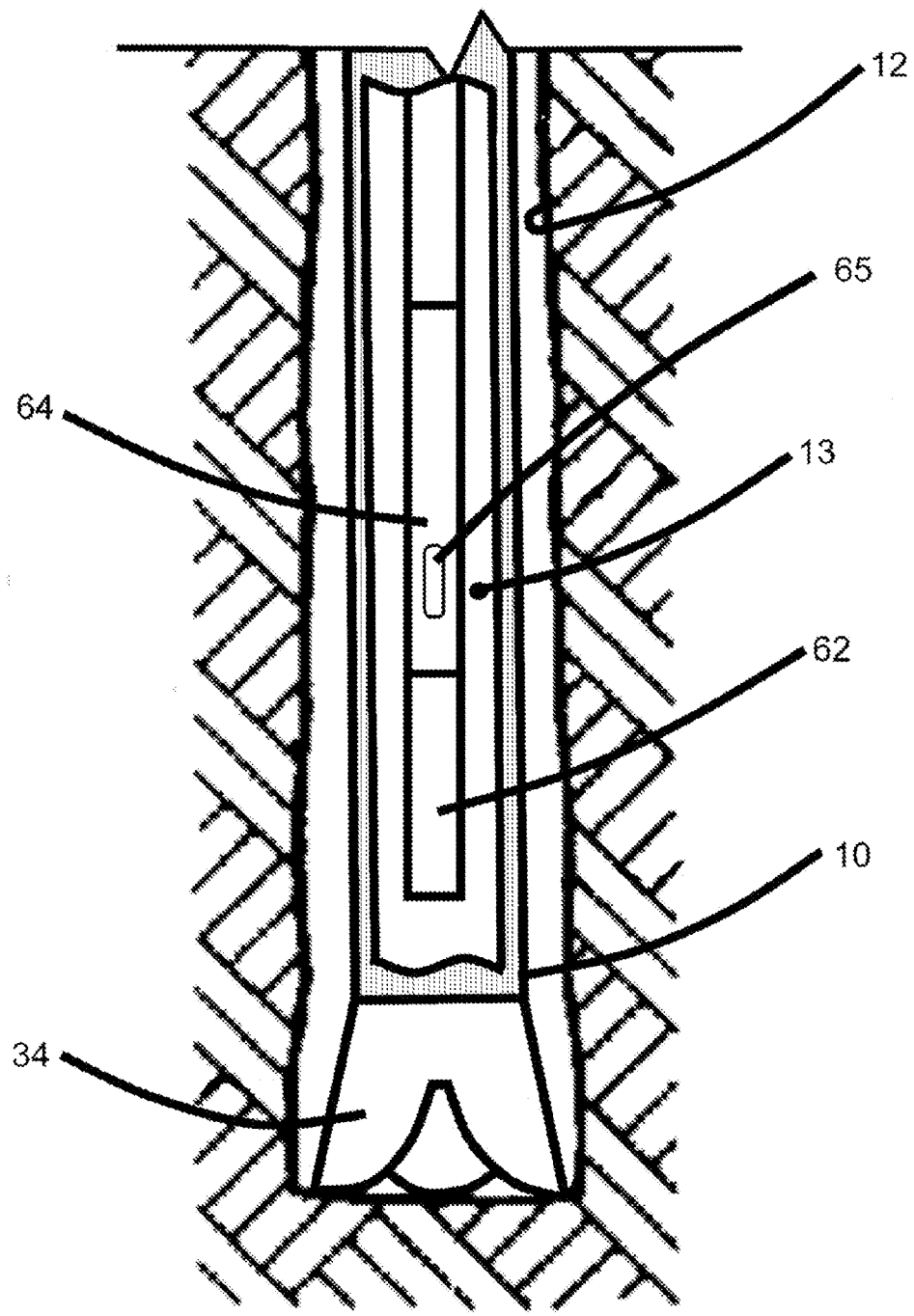
FIG. 1B is a partial cutaway of the lower portion of the MWD tool shown as shown in FIG. 1A.

FIG. 1B shows a partial cutaway of the lower portion of the MWD tool 10 to reveal pulser 62 connected to servo pulser 64. Both are located within the inner diameter of MWD tool 10. The one end of pulser 62 is connected to servo pulser 64 to create a path for drilling fluid between those components. The other end of pulser 62 is in contact with the internal drilling fluid column 13 within the inner diameter of MWD tool 10. One or more servo fluid inlets 65 are in contact with internal drilling fluid column 13 are provided on servo pulser 64. The servo screens 104 covering fluid inlets 65 (not depicted in FIG. 1B) are shown in FIGS. 3, 4A, 10, 11A.

Figure 2:
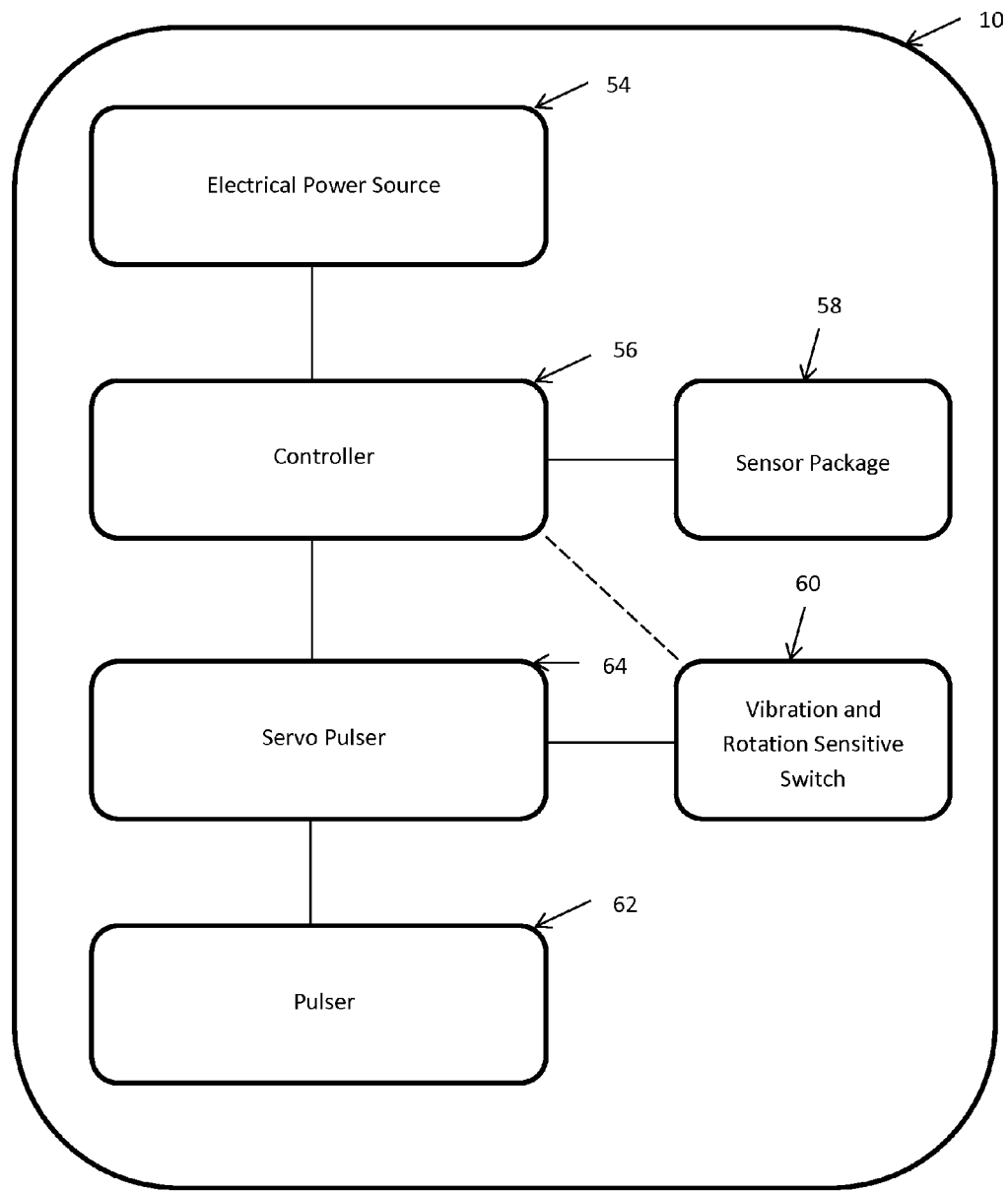
FIG. 2 is a representative view of the various components that together may comprise the downhole portion of an MWD tool.

FIG. 2 generally shows a schematic representation of the various components that together make up the downhole portion of an MWD tool. The downhole MWD tool 10 consists of an electrical power source 54 coupled to controller 56. Controller 56 is coupled to sensor package 58 and servo pulser 64. The servo pulser 64 is coupled to a vibration and rotation sensitive switch 60 and a pulser 62.

FIG. 2 shows one embodiment of the method of the MWD tool. Another embodiment (not depicted) is one in which the vibration and rotation sensitive switch 60 is integrated into the servo pulser 64. Another embodiment (not depicted) is one in which controller 56 is integrated into the servo pulser 64 which is directly connected to sensor package 58.

Controller 56 in FIG. 2 has the ability to be alerted or informed of the status of the vibration and rotation present in the drill string either by directly communicating to the vibration and rotation sensitive switch 60 or by having this information transmitted through the servo pulser 64. The vibration and rotation sensitive switch 60 can be integrated into the controller 56 and can thereby acquire this information directly.

Figure 3:
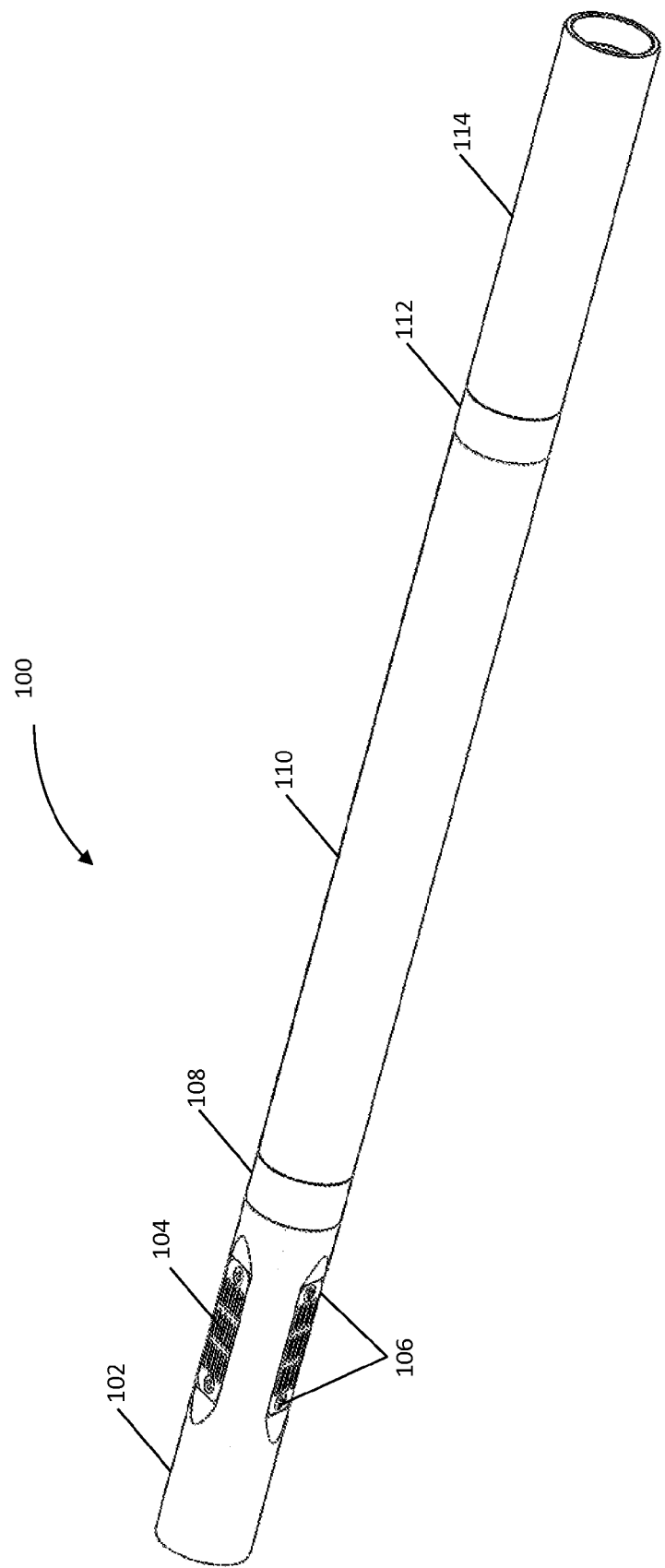
FIG. 3 is a three dimensional view of one embodiment of the servo pulser.

FIG. 3 generally shows a three dimensional view of a servo pulser 100 in an embodiment. The outer sections of the servo pulser 100 comprises of a servo screen housing 102 onto which are mounted a plurality of screens 104 using screws 106. The purpose of the screens 104 is to allow drilling fluid to enter the valve portion of the servo pulser 100 that are located substantially inside the servo screen housing 102 while at the same time restricting the ingress of large particulate matter as are sometimes present in the drilling fluid. Different types of such filtering mechanisms or screens can be utilized to counter the presence of differing types of contaminants found in the flow.

FIG. 3 also shows the servo screen housing 102 attached to seal bulkhead 108 inside which are substantially located the sealing and shaft mechanisms that allow the operation of said servo valve 101 which is resident inside the servo screen housing 102.

FIG. 3 also shows the seal bulkhead 108 attached to servo housing 110 inside which are substantially located the electromechanical, electrical and electronic components that are used to operate said servo valve.

FIG. 3 also shows the servo housing 110 attached to interconnect bulkhead 112 which in turn is attached to interconnect housing 114. Inside the interconnect bulkhead 112 and interconnect housing 114 are substantially located the components that allow the servo pulser 100 to be mechanically and electrically connected to the controller 56 or electrical power source 54 or in general, to other components that may make up part of MWD tool 10.

In addition, paying attention to FIG. 3 as a whole, it is intended in this particular embodiment of the invention that the interconnect housing 114 be used to attach servo pulser 100 to controller 56 or electrical power source 54 and servo screen housing 102 be used to connect servo pulser 100 to pulser 62 of the MWD tool 10.

Figure 4A:
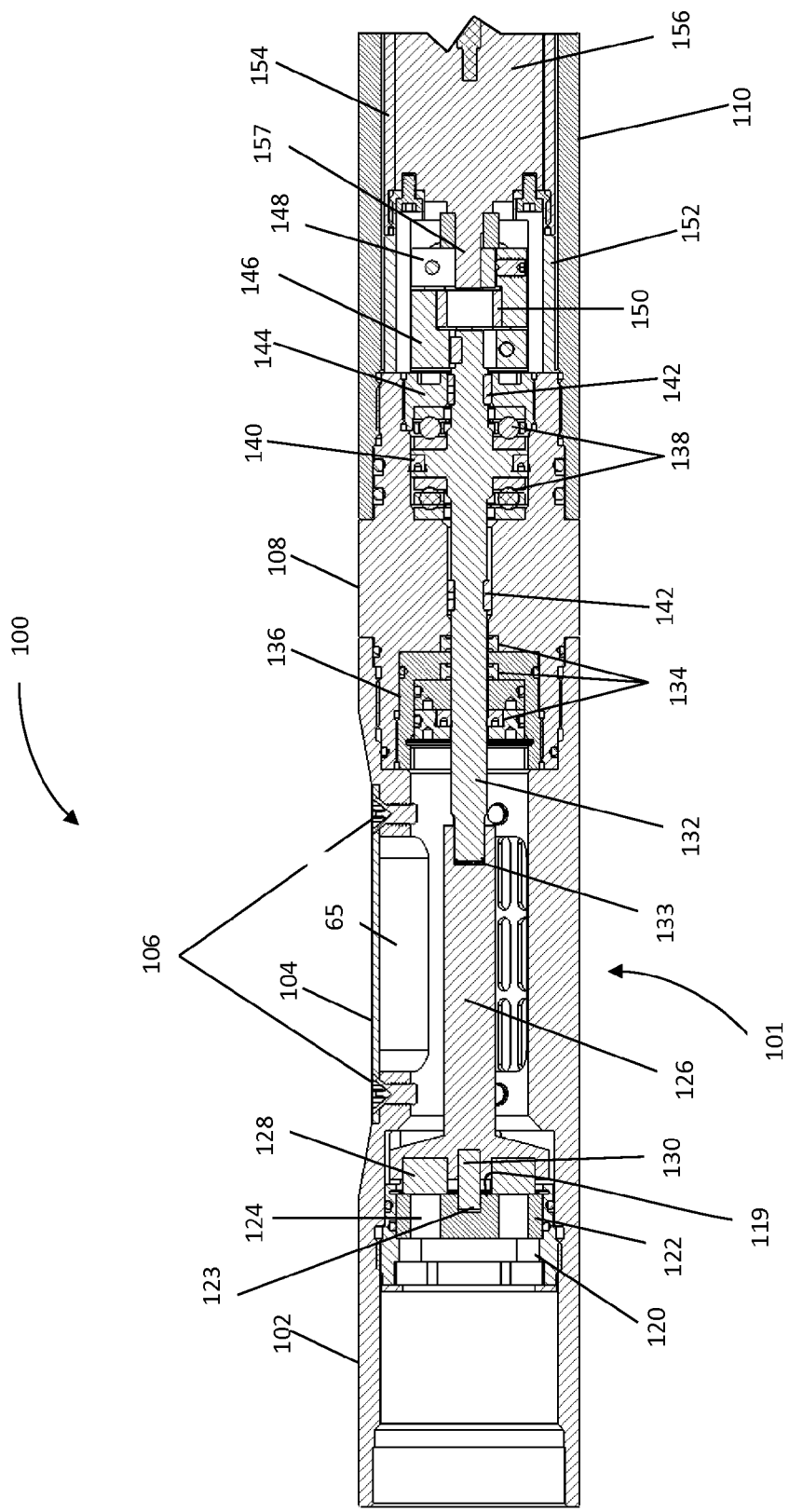
FIGS. 4A through 4C are two dimensional cross section views of the servo pulser as embodied in FIG. 3.
Figure 4B:
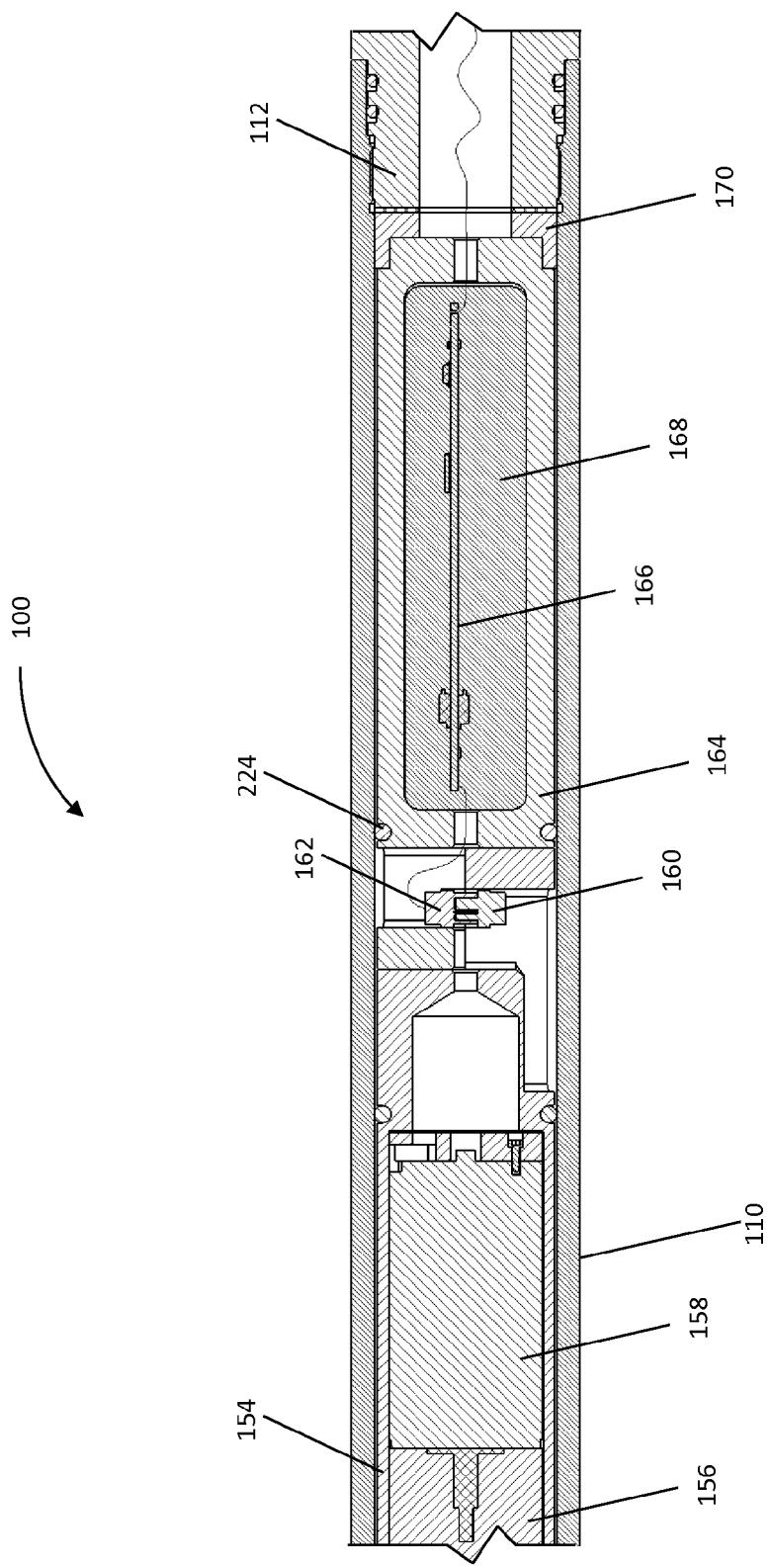
Figure 4C:
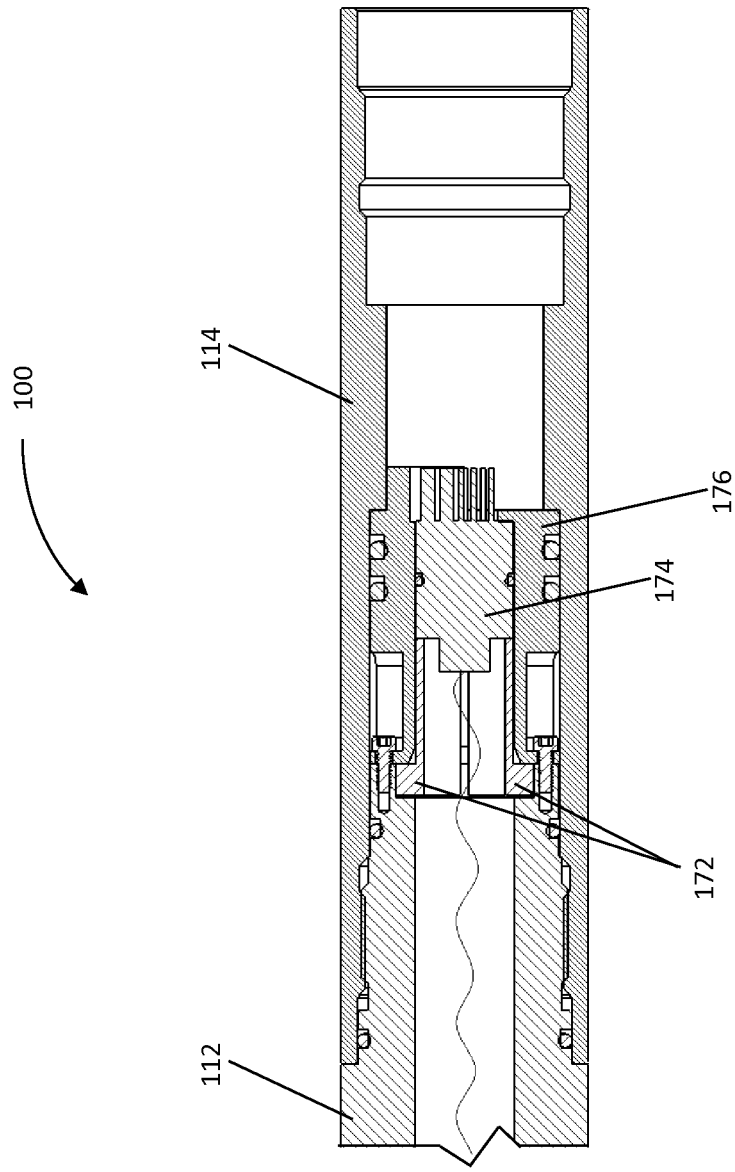

FIGS. 4A, 4B and 4C generally show a cross section view of servo pulser 100 as depicted in one of its embodiments as shown in FIG. 3.

Figure 5:
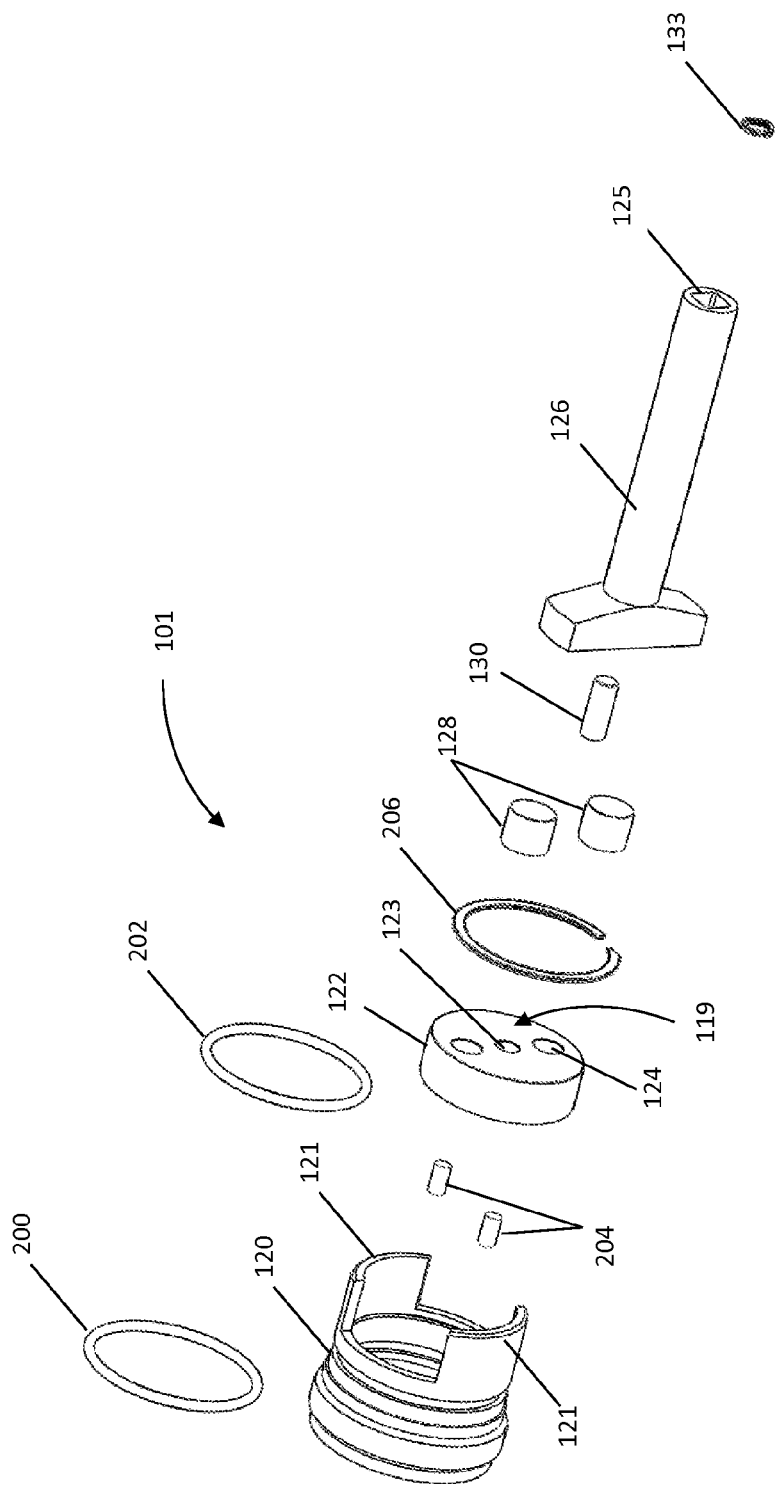
FIG. 5 is an exploded three dimensional view of the servo valve section of the servo pulser as embodied in FIG. 3.

FIG. 5 generally shows an exploded three dimensional view of the rotary servo valve which is substantially located inside servo screen housing 102.

Figure 6B:
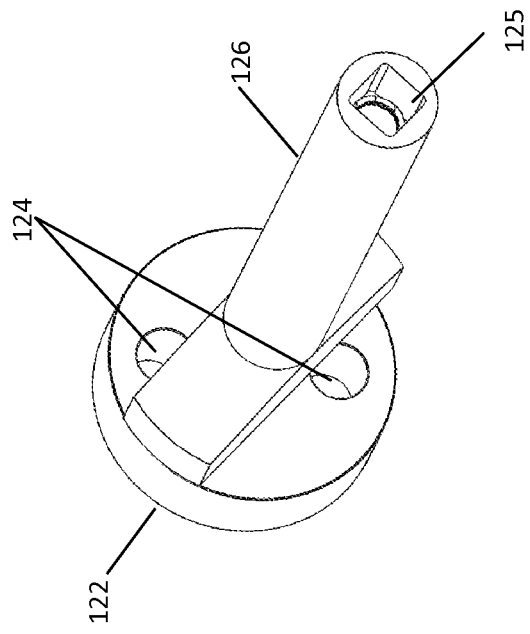
FIG. 6B is a three dimensional view of parts of the servo valve of the servo pulser as embodied in FIG. 3 shown in another orientation where the valve is open.
Figure 6A:
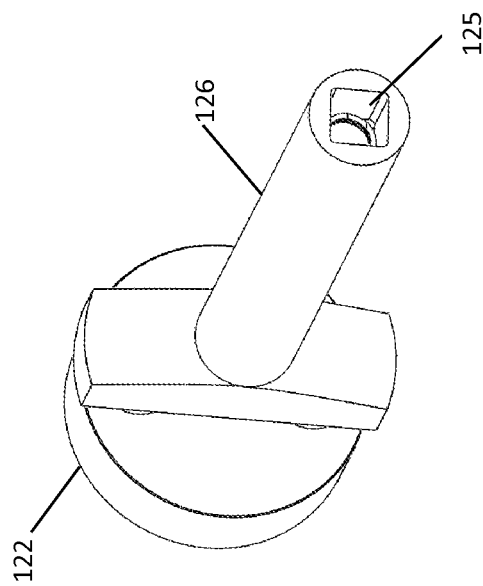
FIG. 6A is a three dimensional view of parts of the servo valve of the servo pulser as embodied in FIG. 3 shown in one orientation where the valve is closed.

FIGS. 6A and 6B generally show three dimensional views of the servo valve which is substantially located inside servo screen housing 102 in both their open and closed orientations.

Figure 7:
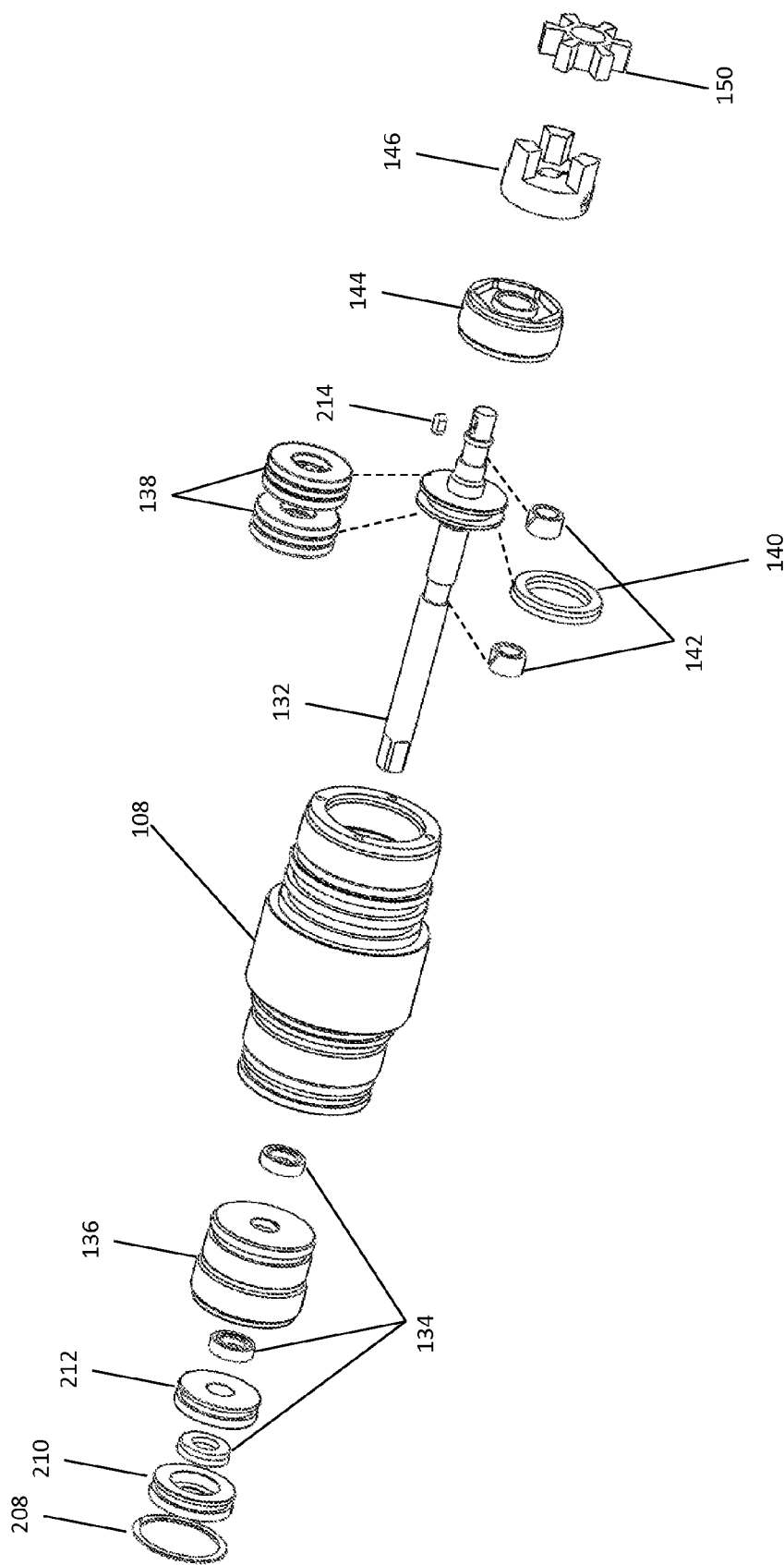
FIG. 7 is an exploded three dimensional view of the drive shaft and sealing mechanism of the servo pulser as embodied in FIG. 3 that is used to rotate the servo valve between its two orientations.

FIG. 7 generally shows an exploded three dimensional view of the drive shaft and sealing mechanisms that are substantially located inside seal bulkhead 108.

In order to further explain the components and for purposes of convenience and clarity, the following will describe individual sections of servo pulser 100 shown in FIGS. 4A, 4B and 4C while referring to FIGS. 5, 6A, 6B, and 7 which show substantially these same components in a three dimensional view.

Referring to FIG. 5, servo seat 122 is installed inside servo seat retainer 120 with the aid of locating pins 204. The locating pins 204 align the servo seat 122 to servo seat retainer 120 and restricts the ability of the servo seat 122 to rotate relative to the servo seat retainer 120. In addition, radial seal 202 is installed around the outer diameter of servo seat 122 prior to its insertion into servo seat retainer 120 and serves to stop all fluid flow between the outer diameter of servo seat 122 and inner diameter of servo seat retainer 120. Retaining ring 206 is installed at the face of servo seat 122 and onto a slot on the inside diameter of servo seat retainer 120 so as to restrict the ability of servo seat 122 to move axially (along the length of the servo pulser 100). In addition, radial seal 200 is installed onto the outside diameter of servo seat retainer 120 and when the servo seat retainer is installed into servo screen housing 102, seals the outside of the servo seat retainer 120 so as to restrict the ability of drilling fluid to leak between the outside diameter of the servo seat retainer 120 and the inside diameter of servo screen housing 102.

Servo tips 128 are attached to servo shaft 126 by means of an interference press fit. In one embodiment, servo tips 128 are located in lateral extensions reaching radially off the axis of rotation of servo shaft 126. In addition, dowel pin 130 is also attached to servo shaft 126 by means of an interference press fit.

The servo tips 128 are pressed onto the face 119 of servo seat 122 and are located radially by guiding dowel pin into a matching hole 123 in the center of the servo seat 122. In this manner, the servo shaft 126 with the servo tips 128 are located to the servo seat 122 in such a manner as to allow the servo shaft 126 to be rotated relative to the servo seat 122.

FIG. 5 also shows compliant member 133 goes into the hole 125 and which is intended to provide an axial force to enable the servo tips 128 to be pressed against the face of servo seat 122 in order to provide adequate sealing.

FIG. 6A shows a three dimensional model of parts of this assembly when mated together where in the orientation shown, the servo holes 124 are covered completely by servo tips 128 and no fluid is allowed to flow through. FIG. 6B shown another orientation of the same where the servo shaft 126 has been rotated counter clockwise and the servo holes 124 are now opened and fluid is allowed to flow from outside the servo pulser 100, through the holes in servo screens 104, past the servo shaft 126 and through servo holes 124 in the servo seat 122 and ultimately to the pulser 62 which is located below servo pulser 100.

Rotating a shaft to open and close a hole in this manner is advantageous in many ways. One of these advantages is the ability open and close the servo valve 101 rapidly and completely and thereby creating an unobstructed path for the fluid to flow. In addition, the symmetric nature of the Shear Valve design allows for the opening and closing of 2 holes simultaneously and thereby doubling the area available for fluid to flow through the servo valve 101. In addition, a predominant number of products in the prior art attempt to achieve such opening and closing of a fluid passage by axially moving the shaft, either through the use of solenoids or lead screws and motors. These methods are unable to fully retract the shaft in a reasonable amount of time and as such are susceptible to having the servo holes obstructed by contaminants in the mud. The invention thus described avoids these problems by opening the servo holes completely and fully and in addition, the rotating action of the servo shaft 126 sweeps and displaces any debris that might be obstructing the servo valve and is able to open and close effectively under the harshest conditions.

An advantage to this apparatus is that openings formed by servo holes 124 may be formed large enough, even given the diametrical limitations imposed by the use of servo pulser 100 inside the internal drilling column 13, so as to not significantly impede the flow of drilling fluid on its way to the bit during normal drilling operations. This may reduce erosion and wear on the holes and surrounding structures that is caused due to the high flow velocities of the drilling mud through smaller holes. The maximum theoretical limit on the ratio of a cross-section of the servo holes 124 to that of the servo seat 122 is 0.5, assuming the holes are fully obstructed in one orientation and fully open in the other. In one embodiment, the cross-sectional ratio is at or above 0.08; in another at or above 0.05; and in another at or above 0.03. In one embodiment, each of the two servo holes 124 is about ¼ inch in diameter, is located symmetrically off-axis with respect to the rotational axis of servo shaft 126 at about a center-to-center distance of ¾ inch, and ratio of the diameter of servo holes 124 to that of face 119 of servo seat 122 is about 1:5. The ratio of a cross-section of the servo holes 124 to that of the outer diameter of the servo valve 101 is, in one embodiment, about 0.035. Having a larger flow area through a servo valve is also an advantage as it allows greater forces to be imparted to the pulser thus increasing the robustness and reliability of such valves.

Another advantage of using the action of rotating a servo shaft to operate a rotary servo pulser is that it permits the servo valve and servo pulser to be relatively shorter than those in the prior art. A shorter length may allow the MWD tool, as built, to be stiffer and also to not need special flexible members to allow for the curvature of the borehole. In one embodiment, the slenderness ratio of the servo pulser 100 (length/o.d.) is less than 18. In one embodiment, the slenderness ratio of the servo valve 101 (length/o.d.) is less than 2.25 (where the length is the combined installed length of servo seat 122, servo seat retainer 120, and servo shaft 126).

Servo seat 122 and servo tips 128 are preferably made out of a hard material to provide significant resistance to erosion and wear caused by the repeated opening and closing of said servo valve 101. Some such materials can be made from cemented ceramics or carbides such as aluminum oxide, silicon carbides, tungsten carbides. Although such hard materials are generally better in applications, it can be seen that in some embodiments, standard metal or plastic components may be used as a means to reducing manufacturing costs.

Having the edge of the servo tip 128 be sharp where it is in contact with servo seat 122 significantly adds to the cutting and sweeping ability of the servo valve 101. The action of rotating the servo shaft 126 in effect causes the sharp knife like edge of the servo tip 128 to sweep across the face of the servo seat 122 and thereby cut any contaminants that may be obstructing the servo holes 124. This shearing action is highly desirable in MWD applications where additives and contaminants in the drilling mud may frequently cause jams in some equipment.

In the embodiment shown in FIG. 5, the servo shaft 126 is allowed to rotate between two orientations that are controlled by mechanical stops 121 built into the servo seat retainer 120. It can be seen that mechanical stops 121 are located radially outward of servo seat 122 and are in indirect contact with, and in a fixed rotational orientation to, servo seat 122. Mechanical stops 121 provide a rotational position that is fixed with respect to servo seat 122. Other embodiments are clearly possible and may include having no such stops, a single stop or multiple stops. In another embodiment (not depicted), the servo shaft 126 can be rotated continuously (at least at times) to create a sequence of pulses due to opening and closing whose frequency is controlled by the speed of rotation of the servo shaft 126 and the number of flow paths obstructed by the servo shaft 126. Servo shaft 126 may be made of a material, such as a chrome stainless steel that is more resilient, and shock- and impact-resistant than servo seat 122 and servo tips 128.

FIG. 5 shows an embodiment of the servo valve design where the servo holes 124 through servo seat 122 and the servo tips 128 are circular in nature. Other embodiments are possible where the number and shapes of the servo holes 124 and the shape of the servo tips 128 are varied. In one such embodiment (not depicted), the servo holes 124 and servo tips 128 are wedge shaped and the action of rotating the servo shaft opens and closes a fluid passageway whose edges are straight lines. Another such possible embodiment is one where the servo holes 124 and servo tips 128 are of unequal diameter and positioned in such a manner as to allow for the opening and closing of servo holes of varying sizes by reciprocating the rotation of the servo shaft.

Another embodiment (not depicted) is one in which the direction of the fluid flow is reversed and the servo tips 128 and servo shafts 124 are positioned on the exit side of the fluid flow path as opposed to the embodiment shown in FIG. 5 where they are positioned on the inlet side of the servo valve 101.

Another embodiment (not depicted) is one in which the servo shaft 126 is fitted through a hole in the center of the servo seat 122 and the servo tips 128 are located on the exit side of the fluid flow but still allow the act of rotation to be controlled from the inlet side of the fluid flow.

Referring to FIG. 4A, it can be seen that the servo valve 101 in this embodiment is located substantially inside servo screen housing 102 is rotated between two different orientations by the rotating action of servo shaft 126. The rotation of servo shaft 126 is controlled by the rotation of servo drive shaft 132 which is rotationally coupled to the servo shaft 126. Compliant member 133 is disposed axially in hole 125 between servo shaft 126 and servo drive shaft 132 and serves to adjust for manufacturing tolerances and stack up errors during assembly, in addition to providing a constant axial force that presses servo tips 128 onto the face 119 of servo seat 122. This constant force keeps the servo tips 128 in constant contact with the servo seat 122 even when the servo pulser 100 is subject to high vibrations and shock that are present in the drilling environment. In the embodiment shown in FIG. 4A, the compliant member is an axial compression spring of a wave type, however other spring like or compliant members can also be used in other embodiments.

Referring to FIG. 7, servo drive shaft 132 is located substantially inside seal bulkhead 108 and is located axially and radially using axial thrust bearings 138 and radial sleeve bearings 142. Axial thrust bearings 138 allow the servo drive shaft 132 to be located axially inside the seal bulkhead 108 and are used to support any inertial or thrust loads that are imparted onto the servo drive shaft 132. The axial thrust bearings 138 and consequently the servo drive shaft 132 are captured between a shoulder internal to seal bulkhead 108 and the face of thrust retaining nut 144 and in this manner, the servo drive shaft 0.132 is allowed to rotate freely inside the seal bulkhead 108. In addition, radial sleeve bearings 142 are mounted onto grooves on the servo drive shaft 132 and when the servo drive shaft 132 is inserted into the seal bulkhead 108, the radial sleeve bearings 142 are captured radially inside an inner diameter of seal bulkhead 108 and thereby allow the servo drive shaft to be supported radially against any frictional, dynamic or inertial loads that the servo drive shaft may sustain during its usage in the drilling environment.

The embodiment shown in FIG. 7 depicts a direct sealing method whereby the internal electromechanical, electrical and electronics components used to rotate said servo drive shaft 132 are isolated from the downhole drilling environment by the action of a plurality of high pressure dynamic radial seals 134. These dynamic radial seals 134 are preferably of the PolyPak type or of a T-Seal type as manufactured and marketed by many companies such as Greene Tweed or Parker Hannifin. It will be clear to one knowledgeable in the art that beyond the design considerations of being able to seal effectively in the environment with low friction and providing sufficient resistance to fluid invasion caused by mechanical, thermal, chemical and other effects that are found in the drilling environment, many different seal mechanisms and products can be used to achieve the goal of sealing the internal components of the servo pulser 100 from the drilling environment. In the embodiment shown in FIG. 7, a combination of PolyPak and T-seals has been shown as a representative example.

The dynamic radial seals 134 are captured relative to the seal bulkhead 108 and are disposed radially over servo drive shaft 132 by the use of a plurality of seal retaining nuts 136, seal retaining plates 210 and 212 and retention rings 208. The specific number of such retention devices and their shape and disposition relative to the servo drive shaft 132 and seal bulkhead 108 are controlled by the specific demands of the dynamic radial seals 134 used to seal the servo pulser 100. The embodiment shown in FIG. 7 is a representative example of one such possible method whereby the dynamic radial seals 134 can be mounted onto the servo drive shaft 132 and retained inside seal bulkhead 108, but other embodiments are also possible.

Special attention is drawn to the diametrical surface of servo drive shaft 132 onto which the dynamic radial seals 134 are located. The surface finish or roughness of this location where the dynamic radial seals 134 touch the servo drive shaft 132 is important as a lower surface finish (or a smooth surface) will prolong sealing effectiveness and increase seal life by reducing the mechanical wear of the seals. As such the outer diameter of servo drive shaft 132, in some embodiments, can be machined or ground to an extremely smooth finish, or special low friction coatings may be applied to reduce the friction between the dynamic radial seals 134 and the servo drive shaft 132 and thereby increase the effectiveness of said sealing system.

The servo drive shaft 132 shown in FIG. 7 is connected to a rotary coupling half 146 with the aid of drive key 214. The rotary coupling half 146 and thrust retaining nut 144 enables ease of assembly and disassembly by separating the drive shaft and sealing mechanisms from the gearmotor and drive electronics. In addition, the rotary coupling half 146 allows for minor misalignments between the servo drive shaft 132 and the output shaft of the gearbox 156. The use of elastomeric insert 150 which is disposed between the rotary coupling half 146 and rotary coupling half 148 provides a compliant interface between the output shaft of the gearbox 156 and the servo drive shaft 132 whereby the gearbox 156 is substantially isolated from any inertial or dynamic loads that are carried by the servo drive shaft 132, and thus protects the gearbox 156 from damaging shock and vibration loads.

Thus referring to FIGS. 4A, 5 and 7, it can be seen that the servo holes 124 inside servo seat 122 can be opened and closed by the rotation of the rotary coupling half 146 through elastomeric insert 150 and that any such rotation can be used to cause the servo shaft 126 to be disposed at either its closed orientation as shown in FIG. 6A or its open orientation as shown in FIG. 6B. This rotation can be caused from inside the sealed section of the servo pulser 100 and any such rotation causes the servo valve of servo pulser 100 to open and close in the harsh environment of the downhole drilling environment.

Figure 8:
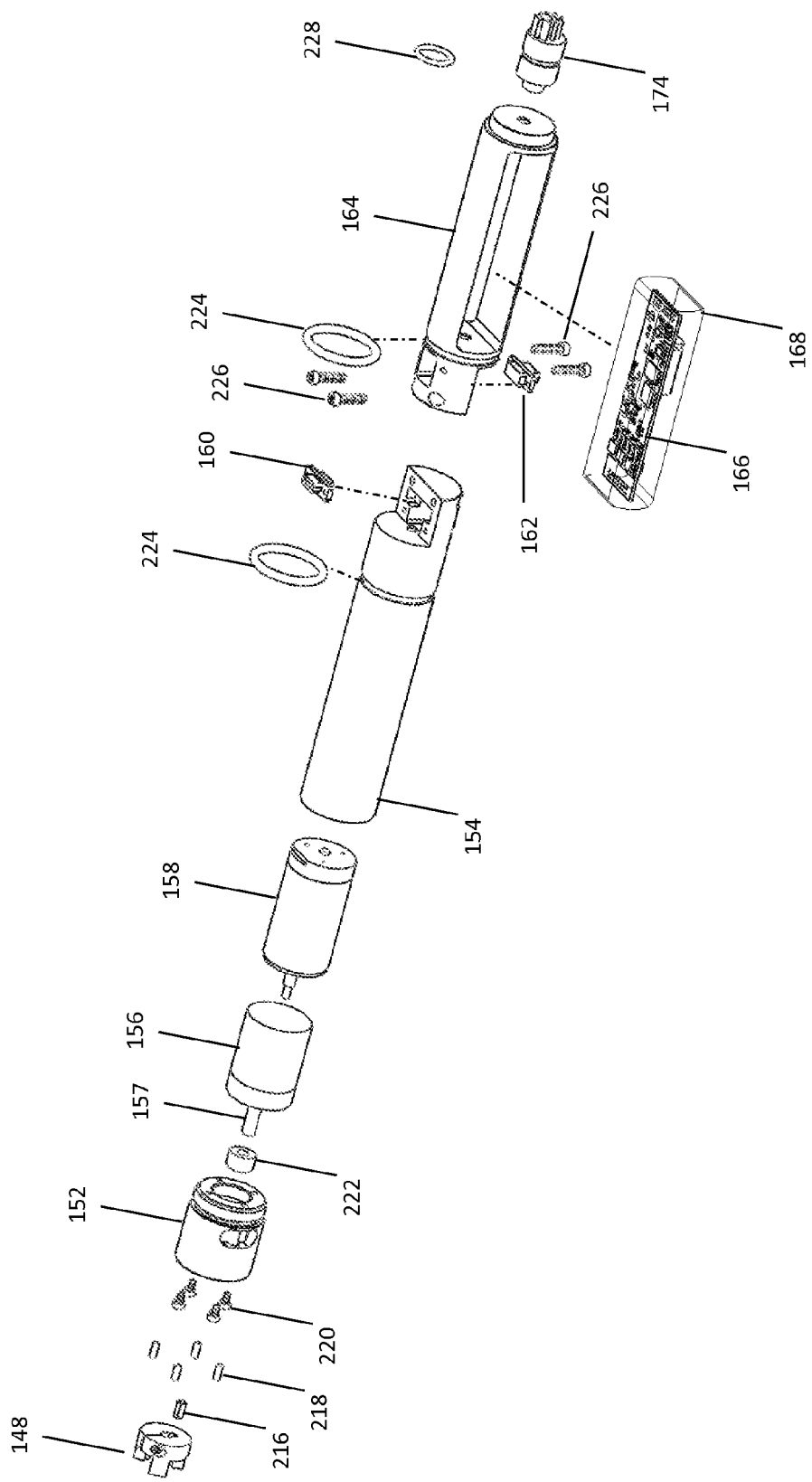
FIG. 8 is an exploded three dimensional view of the electromechanical drive mechanism of the servo pulser as embodied in FIG. 3 that is used to rotate the servo valve between its two orientations.

FIG. 8 shows a three dimensional view of the electromechanical drive mechanism of the servo pulser 100 as embodied in FIG. 3 that is used to rotate the servo valve 101 between its two orientations. A gearbox 156 is coupled to an electric motor 158 and is retained onto gearbox retainer 152 using screws 220. Dowel pins 218 are inserted onto gearbox retainer 152 to allow for alignment of the gearbox retainer 152 to seal bulkhead 108. The assembly just detailed is inserted into gearbox sleeve 154 and secured using thread on the gearbox sleeve 154 and gearbox retainer 152. The wires from the electric motor 158 are fed through a hole in the gearbox sleeve 154 and connected to connector 160.

Coupling spacer 222 is slid onto the shaft of gearbox 156 and is used to properly space rotary coupling half 148. Rotary coupling half 148 is keyed rotationally to the output shaft 157 of gearbox 156 using key 216 and thus, any rotation of the gearbox 156 caused by rotation of electric motor 158 is transmitted directly to the rotary coupling half 148 and then through elastomeric insert 150 and thereby through to the servo valve described previously.

The embodiment shown in FIG. 8 uses an electrically commutated brushless DC motor 158 which has inherent advantages in the high vibration environment of downhole drilling, specifically the lack of graphite or platinum brushes in the commutation assembly. However, other types of motors such as true AC motors of the induction type or stepper motors or brush commutated DC motors can also be used in such an application.

The embodiment in FIG. 8 depicts a gearbox 156 which is of the planetary reduction type and may have multiple stages to provide the proper gearing ratio required to open and close the servo valve in the appropriate amount of time given the available voltages and currents of the electrical power source 54. Such a gearbox can be of different types, such as a spur gearhead or can be eliminated altogether provided the electric motor 158 can provide the appropriate speeds and torques required for this application. In addition, it can be seen that the reduction ratio of the gearbox can be selected or adjusted to provide different speeds and torques to the servo valve 101 without making undue changes to the electric motor 158.

FIG. 8 also shows motor driver 166 which is an electronic component constructed from many sub components such as resistors, capacitors, inductors, digital processors, transistors, amplifiers, sensors and other such electronic components as are required to perform the task of controlling said electric motor 158 and allowing it to be positioned between its two orientations. These components are preferably incorporated in to the form of a Printed Circuit Board (PCB) as shown and assembled using high temperature resistant solder as a primary retention mechanism to retain the components onto the PCB and secondary retention mechanisms such as epoxies, conformal coatings made of silicones or other elastomeric substances as are appropriate for the operating environment of the motor driver 166. These methods are not enumerated and many such mechanisms and methods are available in the prior art and will be apparent to one skilled in the art of the manufacture of such PCBs for downhole environments.

In addition, motor driver 166 is disposed inside electronics chassis 164 and is retained in its position by using a reasonably soft and elastic material or potting material 168. The purpose of such potting material 168 is to allow the motor driver 166 to be mounted inside electronics chassis 164 in such a manner as to avoid any direct contact between the metallic or plastic materials that compose electronics chassis 164 and the motor driver 166 except through the potting material 168 Itself. This isolation of the motor driver 166 from the electronics chassis 164 serves to reduce the shock and vibration levels imparted to the motor driver 166 and to mitigate the effects of the downhole drilling environment from damaging the sometimes fragile components that are part of the motor driver 166. In addition, the use of such potting material 168 serves to allow the motor driver 166 to bend, flex and distort slightly due to the thermal effects of the borehole environment without causing undue stresses to the components mounted onto said motor driver 166.

There are many mechanisms for potting and isolating the electronic components from the chasses on which they are mounted. These methods are well known in the art and other version of such mounting mechanisms will not be enumerated. However it can be said in general that the severity of the drilling environment dictates the complexity and reliability of such mounting mechanisms.

In addition to the potting material 168, O-rings 224 are also used to provide radial support for the electronics chassis 164 and gearbox sleeve 154 when they are inserted or installed into servo housing 110 and ensure that the metallic components of the internal components are not in direct radial contact with the metallic components of the servo housing 110, further aiding in mitigating the damaging effects of vibrations and shock encountered in the drilling environment.

Connector 162 shown in FIG. 8 is connected to wires (not depicted) that are in turn connected to the motor driver 166 and enable any electrical signals to be transmitted to and from the electric motor 158 in the gearbox sleeve 154 through connector 160. The two connectors are securely mated to each other when the gearbox sleeve 154 containing connector 160 is mated to the electronics chassis 164 containing connector 162 using mounting screws 226. In addition, connector 174 is also attached to electrical wires (not depicted) which are in turn connected to the motor driver 166 enabling and relevant electrical signals to be transmitted to and from the servo pulser 100 and other components of the MWD tool 10. The connector 174 preferably incorporates an O-ring 228 which allows the connector 174 to be seal the internal components of the servo pulser 100 from the drilling environment when allowing it to be mated to other connectors external to servo pulser 100 as appropriate.

Figure 9:
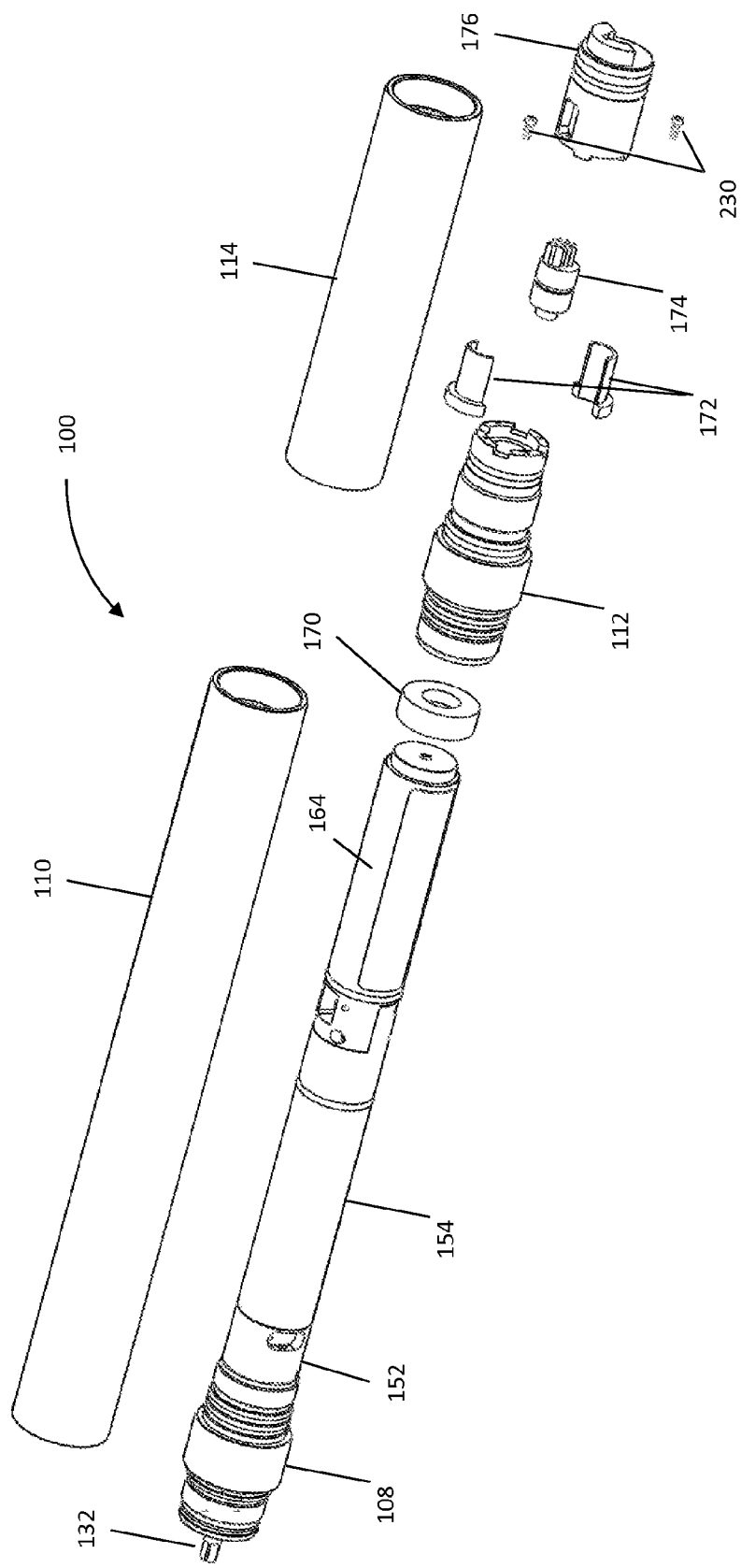
FIG. 9 is a partially exploded view of the items in FIG. 7 and FIG. 8 in addition to components showing details of assembly and mounting.

FIG. 9 shows a partially exploded three dimensional view of parts of servo pulser 100 wherein the sealing and drive mechanisms, the electromechanical drive mechanisms and the assembly and mounting mechanisms are shown in a partially assembled form. With regard to FIGS. 7, 8, 11A & 11C, the electromechanical drive mechanisms and specifically the gearbox retainer 152 are assembled onto the seal bulkhead 108 by means of aligning dowel pins 218 with matching holes in seal bulkhead 108 and concurrently mating the rotary coupling half 146 and rotary coupling half 148 with the elastomeric insert 150 disposed and retained in between them. The electronics chassis 164 is mounted onto the gearbox sleeve 154 using mounting screws 226 and concurrently mating connector 160 to connector 162. Servo housing 110 is slipped over these items and is threaded onto seal bulkhead 108 to the threads adjacent to gearbox retainer 152.

Compression gasket 170 is inserted into servo housing 110 and the interconnect bulkhead 112 is then threaded onto servo housing 110. This causes the compression gasket to be retained between the electronics chassis 164 and the interconnect bulkhead 112 and compressed slightly due to the act of tightening the threads between servo housing 110 and interconnect bulkhead 112. The compression gasket 170 is preferably made of a reasonably soft but compliant material such as rubber or plastic so as to cause the electromechanical components inside servo housing 110 to be held in compression and thus restrict the ability of the components inside servo housing 110 from moving due to shock and vibration loads imparted to the MWD tool 10.

Connector 174 is mounted inside connector retainer 176 and retained in place against axial travel by the use of split rings 172 and retained against rotation by a keyway machined onto connector retainer 176. The connector retainer 176 is mounted onto interconnect bulkhead 112 using screws 230 and as a final assembly step. Interconnect housing 114 is installed over said connector retainer 176 and threaded onto interconnect bulkhead 112.

At this juncture, with respect to FIGS. 3 and 4A, the components comprising the servo valve 101 of said servo pulser 100 can be mounted onto the left of the assembly shown in FIG. 9. Servo shaft 126 is attached with the compliant member 133 disposed inside hole 125 adjacent to the end of servo drive shaft 132 servo seat retainer 120 is mounted inside servo screen housing 102 and screens 104 are mounted onto servo screen housing 102.

In reference to the prior section, wherein one embodiment of the invention is shown, a rotary servo valve that can be opened and closed by using a driver mechanism that is sealed directly against the drilling environment, which has its obvious advantages and some potential disadvantages. One advantage is the determinism by which the servo valve itself can be opened and closed directly without any ambiguity in the position or efficacy of said servo valve. Another advantage is the relative simplicity of such an embodiment where the total number of components required to realize said invention is quite low and as such has clear benefits in assembly, maintenance, operational flexibility and ultimately reliability.

However, one potential disadvantage of the embodiment described in the previous section is the possibility of failure of the product upon leakage of the primary sealing mechanisms. The operational life of the sealing mechanisms are limited and are a function of the hydrostatic pressure in the well bore, the density of the drilling fluid, the operating temperature and the chemical contaminant composition of the drilling fluid, the number of cycles of servo pulser actuation and other variables that are hard to quantify and as such, the operational life of the sealing mechanisms cannot be predicted in accurate detail without undue testing and validation in the operating environment in question.

The following describes a further embodiment of the invention which provides a servo pulser apparatus that is more reliable and robust under all operating conditions than the one described in the previous section. Parts or structures that retain the same numbering are common between the first and second embodiments; parts or structures that may differ between the two are renumbered.

Figure 10:
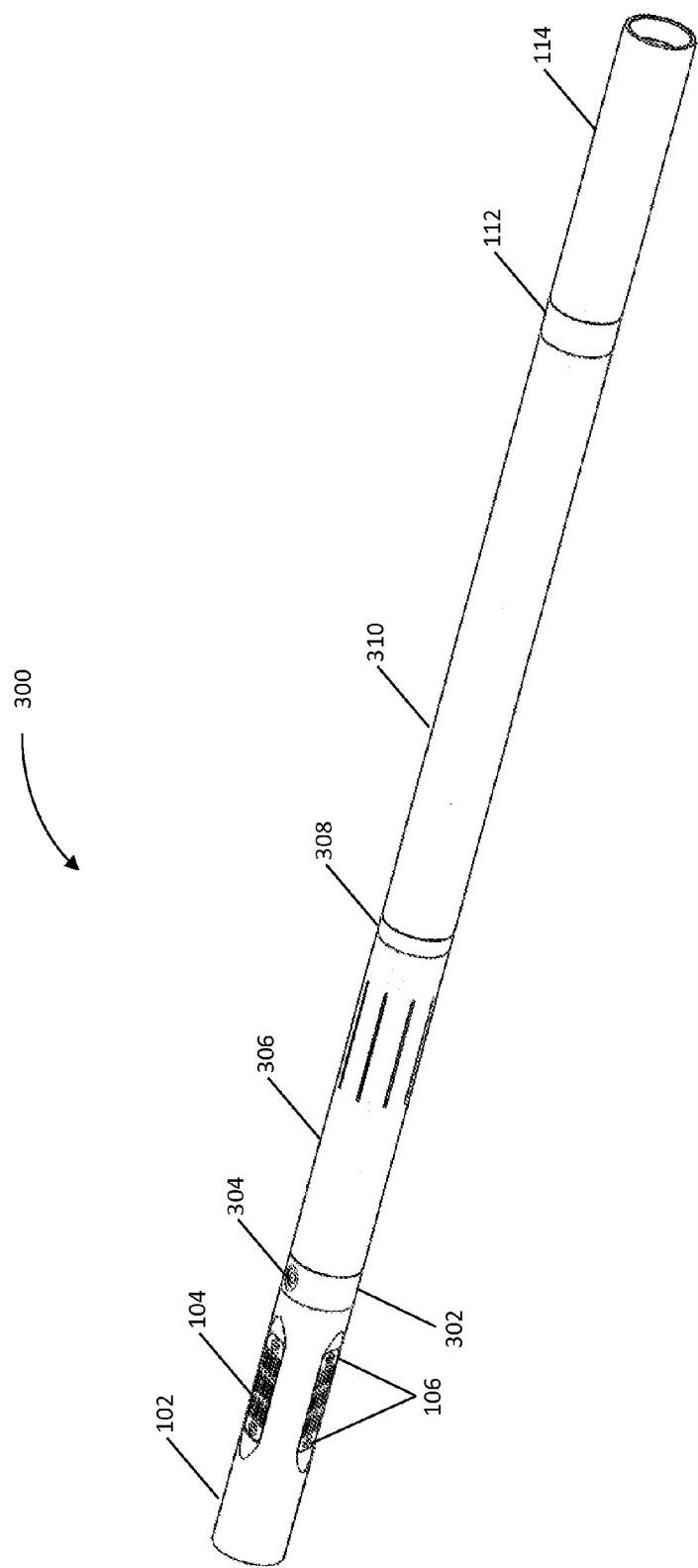
FIG. 10 is a three dimensional view of a second embodiment of the servo pulser.

Referring now to FIG. 10 where a three dimensional view of the servo pulser 300 is shown in a second embodiment. The outer sections of the servo pulser 300 comprises of a servo screen housing 102 onto which are mounted a plurality of screens 104 using screws 106. The purpose of the screens 104 is to allow drilling fluid to enter the valve portion of the servo pulser that are located substantially inside the servo screen housing 102 while at the same time restricting the ingress of large particulate matter as are sometimes present in the drilling fluid. Different types of such filtering mechanisms or screens can be utilized to counter the presence of differing types of contaminants found in the flow.

FIG. 10 also shows the servo screen housing 102 attached to seal bulkhead 302 inside which are substantially located the sealing and shaft mechanisms that allow the operation of said servo valve 101 which is resident inside the servo screen housing 102.

FIG. 10 also shows the seal bulkhead 302 attached to compensator housing 306 inside which are substantially located the mechanical and pressure compensation mechanisms that are used to operate said servo valve 101.

FIG. 10 also shows the compensator housing 306 attached to magnetic bulkhead 308 which in turn attached to pulser housing 310 inside which substantially reside the electromechanical, electrical and electronic components that are used to operate said servo valve 101.

FIG. 10 also shows the pulser housing 310 attached to interconnect bulkhead 112 which in turn is attached to interconnect housing 114. Inside the interconnect bulkhead 112 and interconnect housing 114 are substantially located the components that allow the servo pulser 300 to be mechanically and electrically connected to the controller 56 or electrical power source 54 or in general, to other components that may make up part of MWD tool 10.

In addition, paying attention to FIG. 10 as a whole, it is intended in this particular embodiment of the invention that the interconnect housing 114 be used to attach servo pulser 300 to controller 56 or electrical power source 54 and servo screen housing 102 be used to connect servo pulser 100 to pulser 62 of the MWD tool 10.

FIGS. 11A, 11B, 11C and 11D generally show a cross section view of servo pulser 300 as depicted in a second embodiment as shown in FIG. 10.

Figure 12:
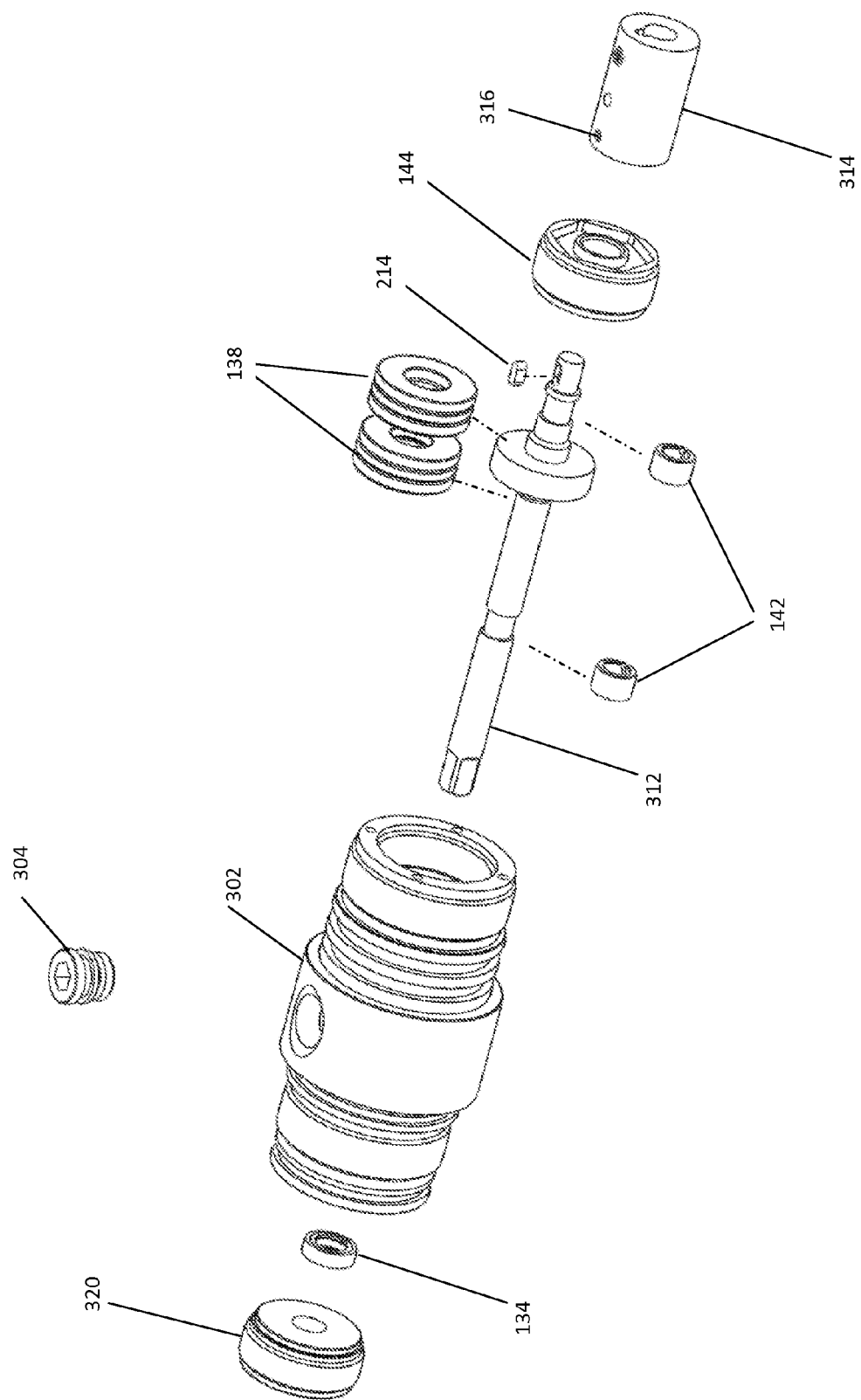
FIG. 12 is an exploded three dimensional view of the drive shaft and sealing mechanism of the servo pulser as embodied in FIG. 10 that is used to rotate the servo valve between its two orientations.

FIG. 12 generally shows an exploded three dimensional view of the drive shaft and sealing mechanisms that are substantially located inside seal bulkhead 302.

In order to further explain the components and for purposes of convenience and clarity, the following will describe individual sections of servo pulser 300 shown in FIGS. 11A, 11B, 11C and 11D while referring to FIGS. 5, 6A, 6B and 10 which show substantially these same components in a three dimensional view.

Referring to FIG. 5, servo seat 122 is installed inside servo seat retainer 120 with the aid of locating pins 204. The locating pins 204 align the servo seat 122 to servo seat retainer 120 and restricts the ability of the servo seat 122 to rotate relative to the servo seat retainer 120. In addition, radial seal 202 is installed around the outer diameter of servo seat 122 prior to its insertion into servo seat retainer 120 and serves to stop all fluid flow between the outer diameter of servo seat 122 and inner diameter of servo seat retainer 120. Retaining ring 206 is installed at the face of servo seat 122 and into a slot on the inside diameter of servo seat retainer 120 so as to restrict the ability of servo seat 122 to move axially (along the length of the servo pulser 300. In addition, radial seal 200 is installed onto the outside diameter of servo seat retainer 120 and when the servo seat retainer is installed into servo screen housing 102, seals the outside of the servo seat retainer 120 so as to restrict the ability of drilling fluid to leak between the outside diameter of the servo seat retainer and the inside diameter of servo screen housing 102.

Servo tips 128 are attached to servo shaft 126 by means of an interference press fit. In addition, dowel pin 130 is also attached to servo shaft 126 by means of an interference press fit.

The servo tips 128 are pressed onto the face 119 of servo seat 122 and are located radially by guiding dowel pin into a matching hole 123 in the center of the servo seat 122. In this manner, the servo shaft 126 with the servo tips 128 are located to the servo seat 122 in such a manner as to allow the servo shaft 126 to be rotated relative to the servo seat 122.

FIG. 5 also shows compliant member 133 which goes into hole 125 and provides an axial force to enable the servo tips 128 to be pressed against the face of servo seat 122 in order to provide adequate sealing.

FIG. 6A shows a three dimensional model of parts of this assembly when mated together where in the orientation shown, the servo holes 124 are covered completely by servo tips 128 and no fluid is allowed to flow through. FIG. 6B shown another orientation of the same where the servo shaft 126 has been rotated counter clockwise and the servo holes 124 are now opened and fluid is allowed to flow from outside the servo pulser 300, through the holes in servo screens 104, past the servo shaft 126 and through servo holes 124 in the servo seat 122 and ultimately to the pulser 62 which is located below servo pulser 300.

The description above for the first embodiment and FIGS. 6A, 6B and the servo seat 122, servo tips 128 and servo holes 124, including the rotation and flow directions, is referred to for the second embodiment.

Figure 11A:
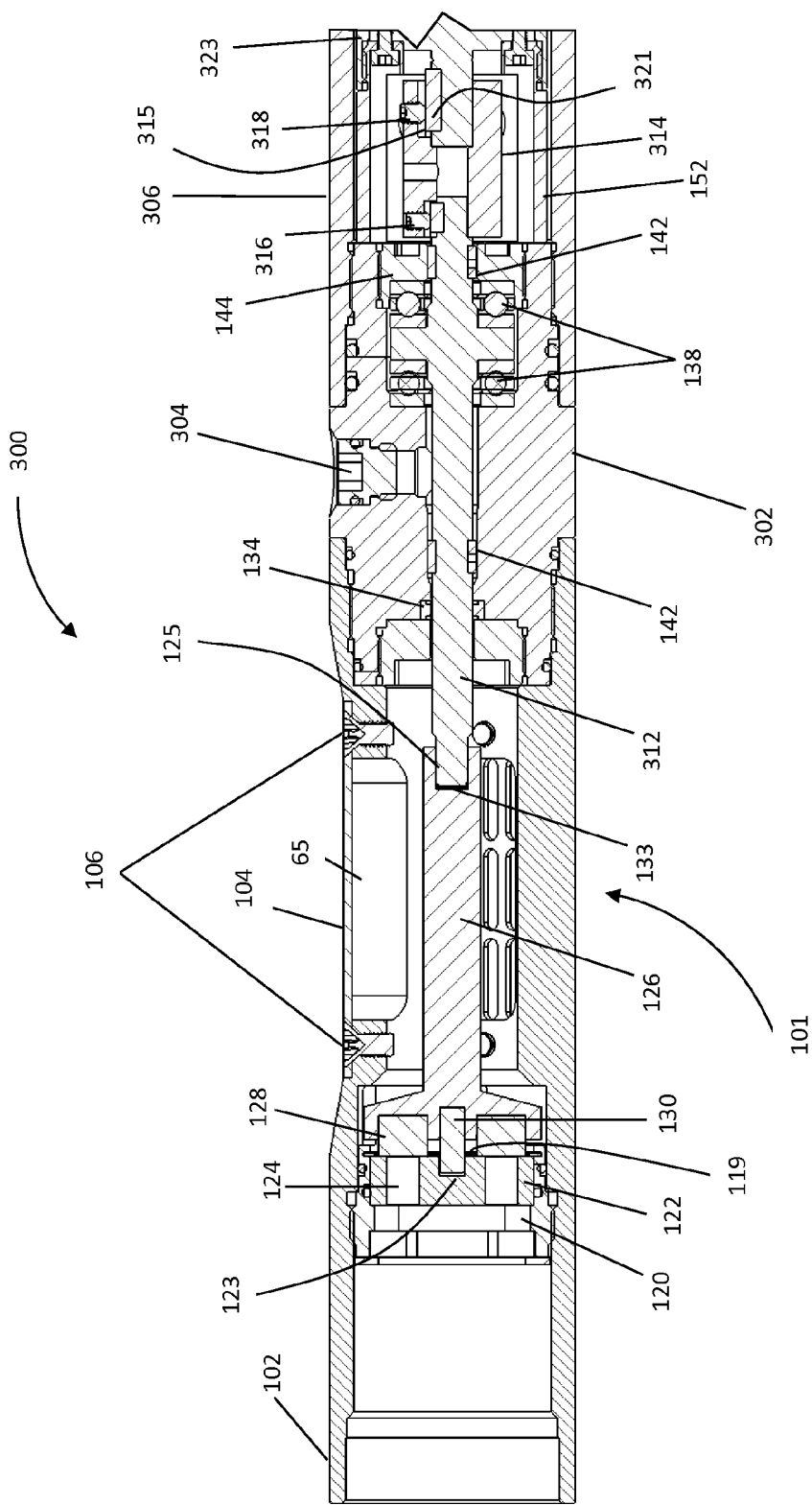
FIG. 11A through 11D are two dimensional cross section views of the servo pulser as embodied in FIG. 10.

Referring to FIG. 11A, it can be seen that the servo valve 101 is in this embodiment located substantially inside servo screen housing 102 and is rotated between two different orientations by the rotating action of servo shaft 126. The rotation of servo shaft 126 is controlled by the rotation of servo drive shaft 312 which is rotationally coupled to the servo shaft 126. Compliant member 133 is disposed axially in hole 125 between servo shaft 126 and servo drive shaft 312 and serves to adjust for manufacturing tolerances and stack up errors during assembly, in addition to providing a constant axial force that presses servo tips 128 onto the face 119 of servo seat 122. This constant force keeps the servo tips 128 in constant contact with the servo seat 122 even when the servo pulser 300 is subject to high vibrations and shock that are present in the drilling environment. In the embodiment shown in FIG. 11A, the compliant member is an axial compression spring of a wave type, however other spring like or compliant members can also be used in other embodiments.

Referring to FIG. 12, servo drive shaft 312 is located substantially inside seal bulkhead 302 and is located axially and radially using axial thrust bearings 138 and radial sleeve bearings 142. Axial thrust bearings 138 allow the servo drive shaft 312 to be located axially inside the seal bulkhead 302 and are used to support any inertial or thrust loads that are imparted onto the servo drive shaft 312. The axial thrust bearings 138 and consequently the servo drive shaft 312 are captured between a shoulder internal to seal bulkhead 302 and the face of thrust retaining nut 144 and in this manner, the servo drive shaft 312 is allowed to rotate freely inside the seal bulkhead 302. In addition, radial sleeve bearings 142 are mounted onto grooves on the servo drive shaft 312 and when the servo drive shaft 312 is inserted into the seal bulkhead 302, the radial sleeve bearings 142 are captured radially inside an inner diameter of seal bulkhead 302 and thereby allow the servo drive shaft 312 to be supported radially against any frictional, dynamic or inertial loads that the servo drive shaft 312 may sustain during its usage in the drilling environment.

The embodiment shown in FIG. 12 depicts a compensated sealing method whereby the internal mechanical components used to rotate said servo drive shaft 312 are isolated from the downhole drilling environment by the action of a single dynamic radial seal 134. This dynamic radial seal 134 is preferably of the T-Seal type as manufactured and marketed by many companies such as Greene Tweed or Parker Hannifin. It will be clear to one knowledgeable in the art that beyond the design considerations of being able to seal effectively in the environment with low friction and providing sufficient resistance to fluid invasion caused by mechanical, thermal, chemical and other effects that are found in the drilling environment, many different seal mechanisms and products can be used to achieve the goal of sealing the internal components of the servo pulser 100 from the drilling environment. The dynamic radial seal 134 is captured relative to the seal bulkhead 302 and is disposed radially over servo drive shaft 312 by the use of seal retaining nut 320.

Special attention is drawn to the diametrical surface of servo drive shaft 312 onto which the dynamic radial seal 134 is located. The surface finish or roughness of this location where the dynamic radial seal 134 contacts the servo drive shaft 132 is important because a lower surface finish (or a smooth surface) will prolong sealing effectiveness and increase seal life by reducing the mechanical wear of the seals. As such the outer diameter of servo drive shaft 312, can in some embodiments, be machined or ground to an extremely smooth finish, or special low friction coatings may be applied to reduce the friction between the dynamic radial seals 134 and the servo drive shaft 312 and thereby increase the effectiveness of said sealing system.

FIG. 12 also shows an oil fill plug 304 which is used in the process of filling portions of the servo pulser 300 with hydraulic oil to aid in the lubrication and pressure compensation of said servo pulser 300. The purpose of oil filling the servo pulser 300 will be described in detail later.

The servo drive shaft 312 shown in FIG. 12 is connected to a shaft coupling 314 with the aid of drive key 214. The shaft coupling 314 allows for a mechanical connection to be made between the servo drive shaft 312 and other components described below while allowing for ease of assembly and disassembly. Set screw 316 is disposed inside shaft coupling 314 and is used to provide a positive lock between the servo drive shaft 312, the drive key 214 and the shaft coupling 314 in such a manner as to eliminate and torsional slippage between the key slots in shaft coupling 314 and the sides of drive key 214.

Thus referring to FIGS. 5, 11A and 12, it can be seen that the servo holes 124 inside servo seat 122 can be opened and closed by the rotation of the shaft coupling 314 and that any such rotation can be used to cause the servo shaft 312 to be disposed at either its closed orientation as shown in FIG. 6A or its open orientation as shown in FIG. 6B. This rotation can be caused from inside the oil filled section of the servo pulser 300 and any such rotation causes the servo valve of servo pulser 300 to open and close in the harsh environment of the downhole drilling environment.

Figure 13:
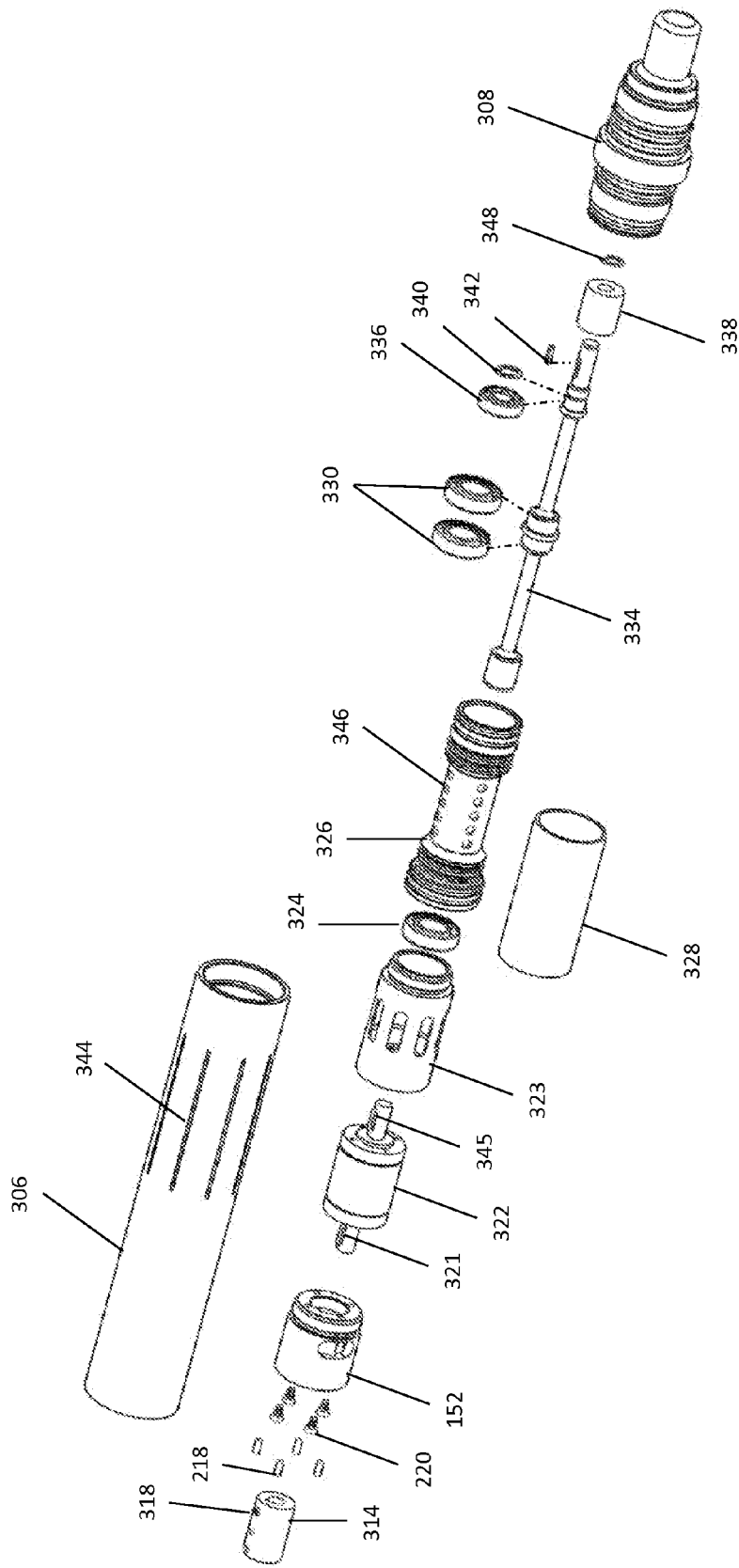
FIG. 13 is an exploded three dimensional view of the mechanical components used to rotate the drive shaft and sealing mechanism of the servo pulser as shown in FIG. 10.

FIG. 13 shows a three dimensional view of the mechanical drive mechanism of the servo pulser 300 as embodied in FIG. 10 that is used to rotate the servo valve 101 between its two orientations. A dual shaft gearbox 322 is retained onto gearbox retainer 152 using screws 220. Dowel pins 218 are inserted onto gearbox retainer 152 to allow for alignment of the gearbox retainer 152 to seal bulkhead 302. The assembly just detailed is inserted into gearbox sleeve 323 and secured using thread on the gearbox sleeve 323 and gearbox retainer 152.

The dual shaft gearbox 322 is preferably of a planetary gearbox type and is preferably manufactured using components that are not susceptible to corrosion. Materials such as stainless steel, brass, bronze or other such materials can be used in so far as they are able to perform the function of the device which is to transmit torque between the input shaft 345 and the output shaft 321 of said dual shaft gearbox 322 while simultaneously reducing the rotational speed of the output drive shaft relative to the input drive shaft and increasing the delivered torque at the output drive shaft relative to the input drive shaft. In addition, another embodiment of such a gearbox would also include a plurality of holes on the outer case of said gearbox so as to allow the free and unimpeded flow of lubricating oil which in this embodiment is also used as a pressure compensation fluid.

Figure 11B:
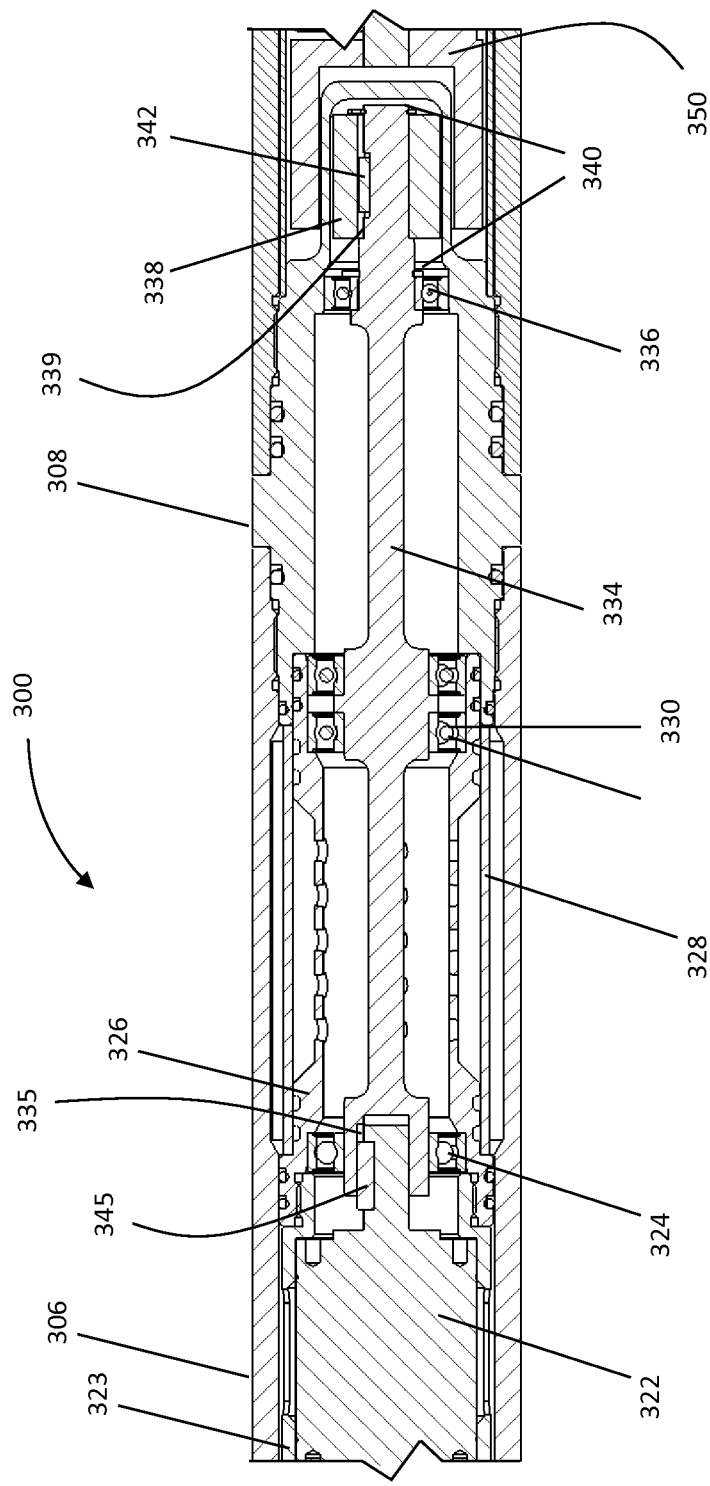

Also with respect to FIG. 11B, radial ball bearing 324 is inserted inside compensator mount 326 which is attached to gearbox sleeve 323, the process of which captures the radial ball bearing 324 between shoulders inside gearbox sleeve 323 and compensator mount 326. Additionally, radial ball bearings 330 are slipped onto intermediate drive shaft 334 which in turn is slid inside compensator mount 326, through the inner diameter of radial ball bearing 324 and in turn is connected to the input drive shaft of dual shaft gearbox 322 by means of drive shaft key 345 and slot 335 on drive shaft 334. Another radial ball bearing 336 is slid onto intermediate drive shaft 334 and held in place axially by snap ring 340.

FIG. 13 also shows a magnetic coupling inner 338 which is a coupling device designed to transmit torque between two drive shafts through the use of a plurality of matched magnets. Several such devices are described in prior art and many such devices are available commercially and magnetic coupling inner 338 is shows as a representative sample of one such commercially available device.

Magnetic coupling inner 338 is slipped onto intermediate drive shaft 334 and is torsionally indicated to the intermediate drive shaft 334 by means of magnetic coupling key 342 and slot 339 and axially captured using snap ring 348.

Compensator membrane 328 is slipped onto compensator mount 326 and is secured in place using twisting wire ties. The compensator membrane is preferably made of a compliant member such as rubber of the fluorocarbon or nitrile type. The selection of rubber materials such as these allow for a compensator membrane 328 that is flexible, resistant to high temperatures, resistant to various chemicals and additives that are used in the drilling fluids and is able to effectively seal the oil filled cavity on the inside of servo pulser 300 from the mud filled environment found downhole.

Also with respect to FIGS. 11A and 11B, the assembly detailed above is inserted into compensation housing 306 and is further captured axially using magnetic bulkhead 308. Magnetic bulkhead 308 is selected so as to be substantially transparent to magnetic flux, thus permitting the flux to pass efficiently between magnetic coupling inner 338 and magnetic coupling outer 350. Magnetic bulkhead 308 is selected so as to be sufficiently strong to retain oil in the oil filled cavity on the inside of servo pulser 300, and still be a thin-walled section in the region separating magnetic coupling inner 338 and magnetic coupling outer 350 and thereby permitting those parts to be situated close to one another. Suitable alloys include those alloys that are high-yield (permitting thinner wall-thicknesses) and substantially non-magnetic, such as NiCoMb, Inconel, BeCu and MP35N.

This assembly as affixed to compensation housing 306 and magnetic bulkhead 308 is in turn attached to the assembled parts shown in FIG. 12 by means of aligning and inserting dowel pins 218 mounted onto gearbox retainer 152 into mating holes on seal bulkhead 302, aligning the drive key 321 on the output shaft of dual shaft gearbox 322 onto the right hand side of shaft coupling 314 and sliding said shaft coupling 314 over said output drive shaft and positively locating these objects using set screw 318.

Figure 14:
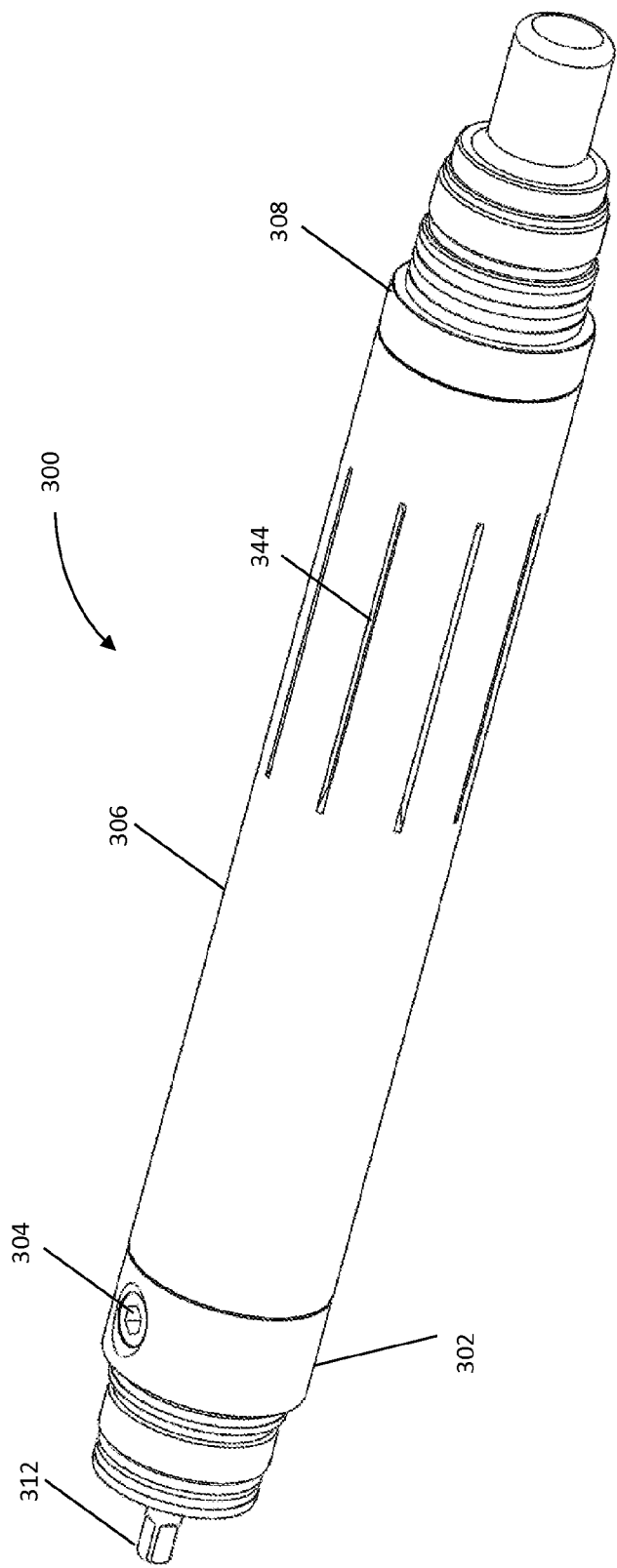
FIG. 14 is an assembled three dimensional view of the components shown in FIGS. 12 and 13.

FIG. 14 shows an assembled three dimensional view of the components shown in FIG. 12 and FIG. 13 and described above. The assembly thus shown is filled with a hydraulic oil and sealed using oil fill plug 304. The hydraulic oil fills all available cavities and volumes inside the assembly shown in FIG. 14 and is sealed against the drilling environment and its drilling fluids and pressures by a plurality of O-rings, dynamic radial seal 134, the compensator membrane 328 and magnetic bulkhead 308.

The assembly thus detailed is a hydrostatically compensated system wherein the hydraulic oil inside the servo pulser 300 is at substantially the same pressure as the drilling fluid due to the compression of the compensator membrane 328 through slots 344 in the compensator housing 306 and the subsequent compression of the hydraulic oil side the oil filled sections of said servo pulser 300 through Holes 346 in compensator mount 326. Selection of the hydraulic oil and the process by which the oil is cleaned, evacuated to remove entrapped air and injected into the oil filled sections is important to the operation of pulsers for use in the drilling environment.

If the hydraulic oil is properly cleaned, de-aired and filled into the servo pulser 300 shown in FIG. 14, then the assembly will be able to survive extremes of hydrostatic pressures in the borehole environment while simultaneously allowing the servo drive shaft 312 to rotate reasonably freely as there is no pressure differential imparted to the dynamic radial seals 132 and as such only running friction and rotational inertia need be overcome to rotate said servo drive shaft 312.

Figure 11C:
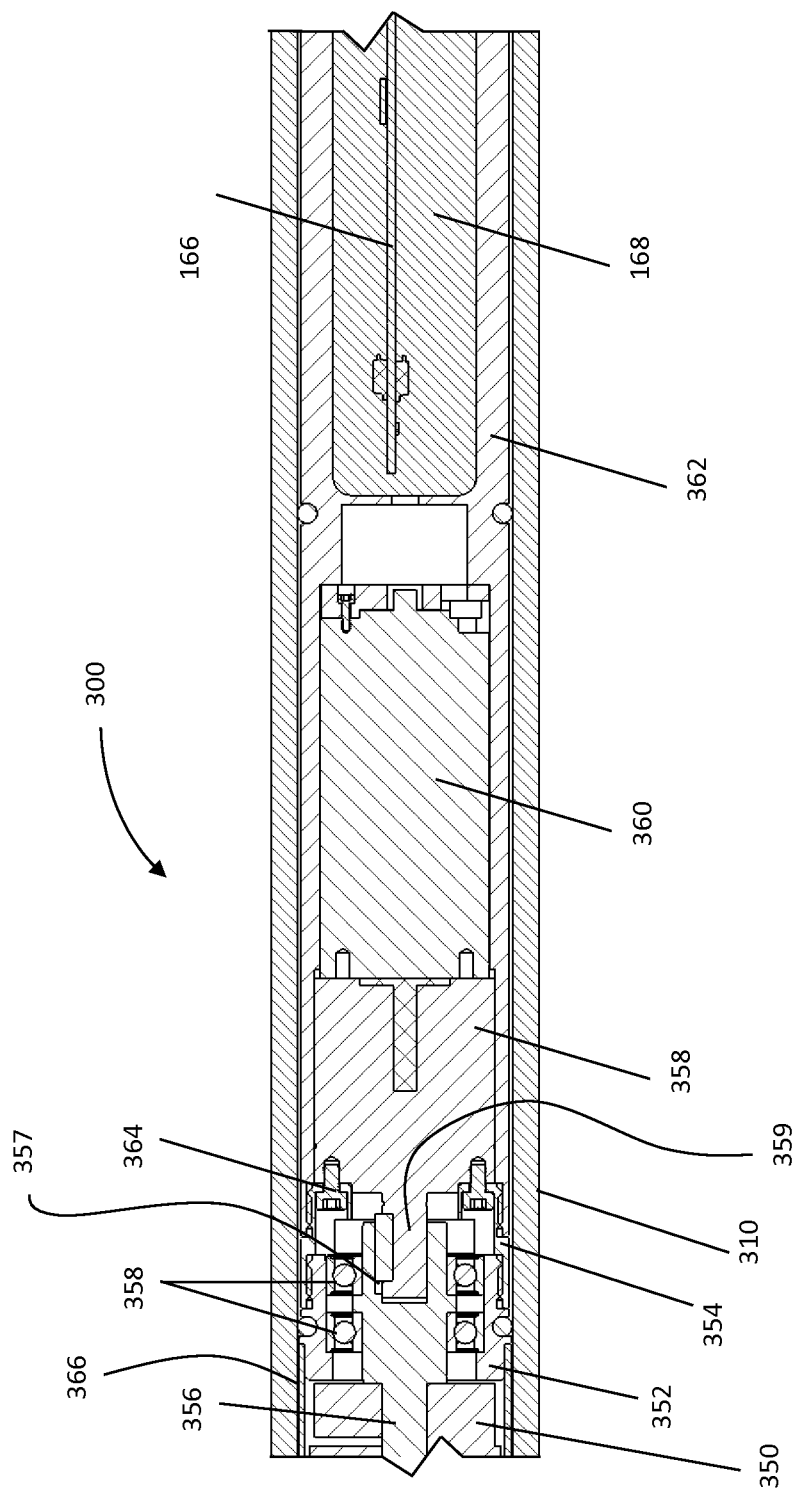
Figure 15:
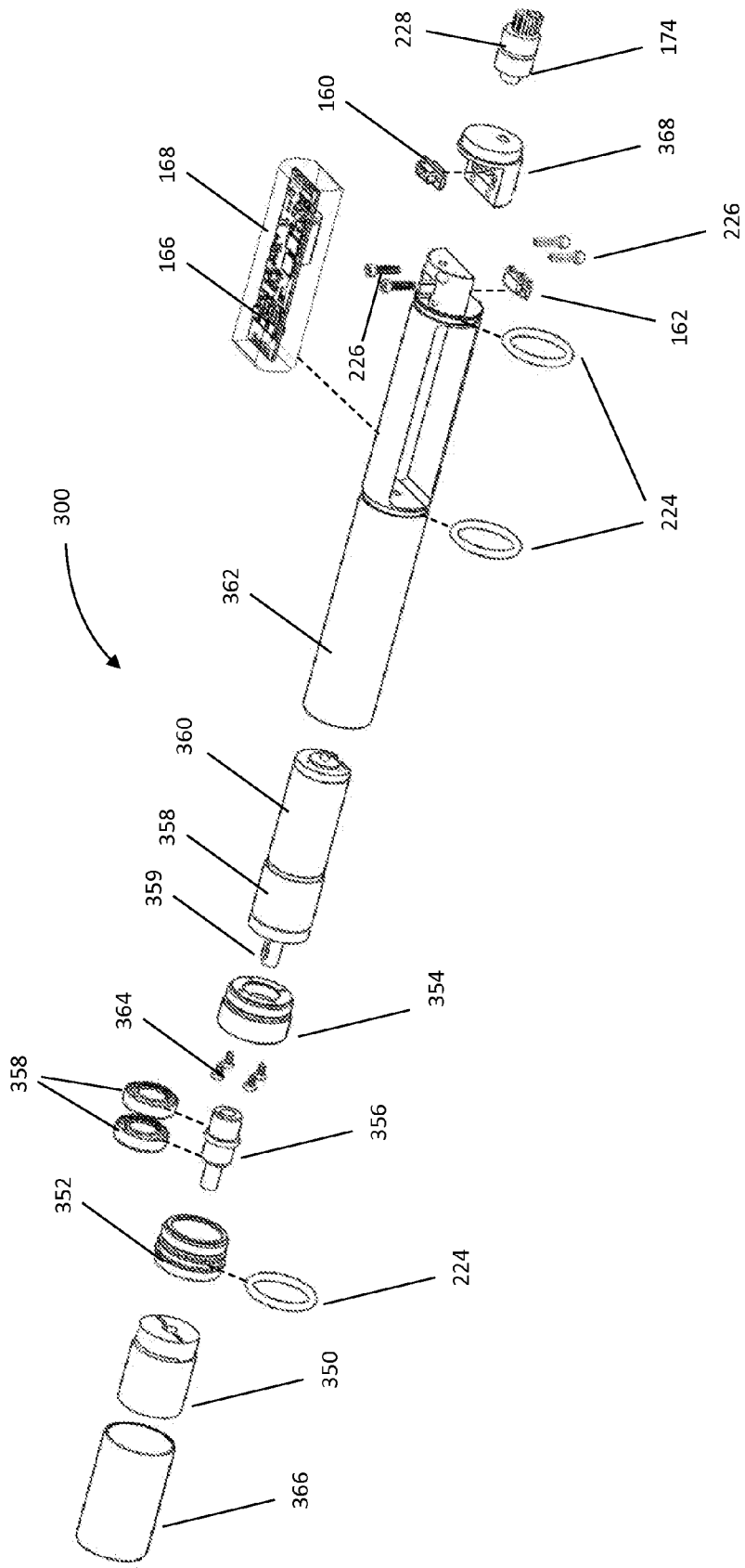
FIG. 15 shows an exploded three dimensional view of the electromechanical and electrical drive mechanism of the servo pulser as embodied in FIG. 10.
Figure 16:
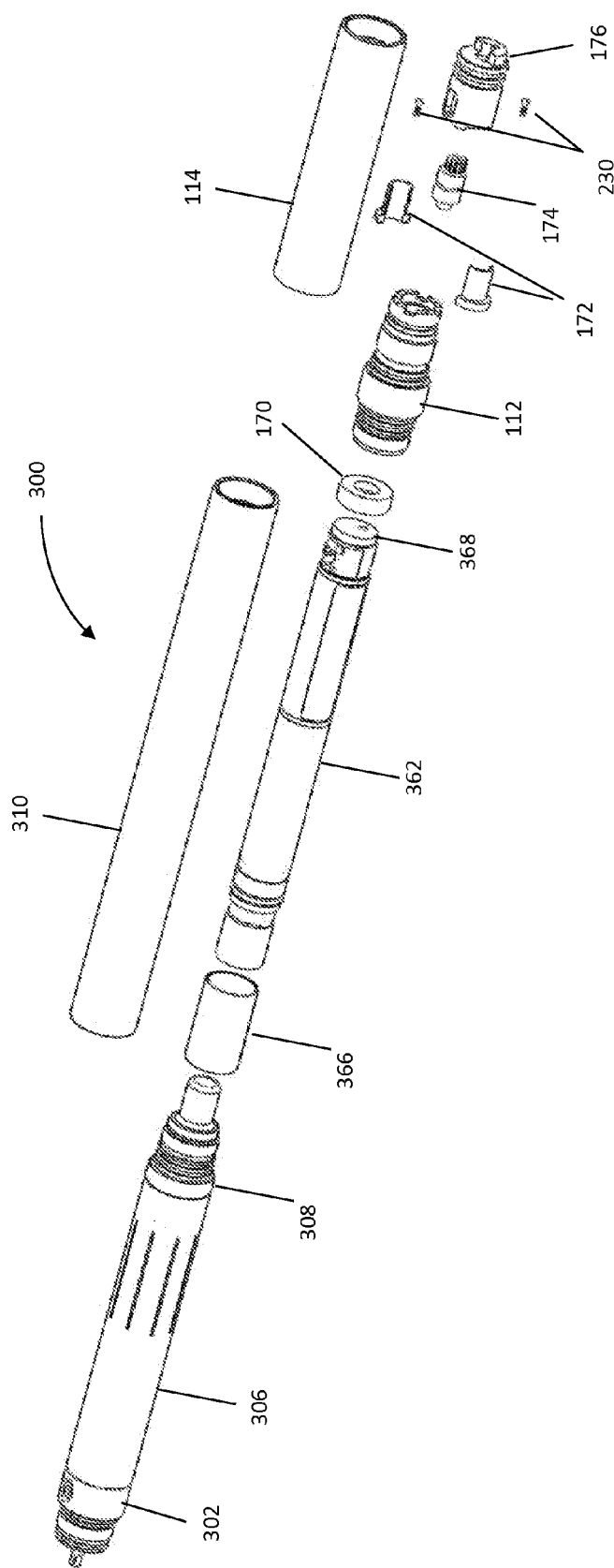
FIG. 16 is a partially exploded view of the items shown in FIGS. 14 and 15 in addition to components showing details of assembly and mounting.

Also with respect to FIGS. 11B & 11C, the assembly detailed FIG. 14 and referring to FIGS. 15 and 16, allows servo drive shaft 312 to be rotated across the magnetically transparent barrier of magnetic bulkhead 308 by the usage of a magnetic coupling outer 350 which is designed to couple with the magnetic coupling inner 338. Magnetic coupling outer 350 can be placed in a secure and sealed environment downhole and does not require the use of any additional dynamic sealing or pressure compensation mechanisms. This ability to retain the magnetic coupling outer 350 and its associated electromechanical and electrical components in a sealed air filled environment and still be able to actuate a valve in the high pressure, contaminated and corrosive environment of the bore well is of great value as it significantly increases the survivability and reliability of the servo pulser 300.

FIG. 15 shows a three dimensional view of the electromechanical drive mechanism of the servo pulser 300 as embodied in FIG. 10 that is used to rotate the servo valve 126 between its two orientations. A gearbox 358 is coupled to an electric motor 360 and is retained onto gearbox retainer 354 using screws 364. Radial ball bearings 358 are inserted onto magnetic coupling shaft 356 and in turn inserted into shaft retainer 352. This assembly then mounted onto gearbox retainer 354 by means of threads on shaft retainer 352 and gearbox retainer 354. The act of threading these two parts together axially and radially locates the radial ball bearings 358 inside the shaft retainer 352 and allows magnetic coupling shaft 356 to spin freely while at the same time allowing it the magnetic coupling shaft to be attached to the output shaft 359 on the left side of gearbox 358 using a keyed slot 357.

With respect to FIGS. 11B & 11C, two gearboxes, 322 and 358, are used to reduce the shaft speed from electric motor 360 and to increase the torque applied to the servo shaft of 126 of servo valve 101. In this embodiment, gearbox 358 increases that torque only part of the needed amount so as to limit the torque transmitted by magnetic coupling outer 350, across magnetic bulkhead 308, to magnetic coupling inner 338. In addition, gearbox 358 decreases the shaft speed, which reduces magnetic losses and heating in magnetic bulkhead 308 caused by the rotating magnetic fields caused by magnetic coupling outer 350 and magnetic coupling inner 338. In another embodiment (not depicted), in which the torque-transmission limitations and magnetic losses and heating are less prominent, only one gearbox is used. In another embodiment (not depicted), having a motor that providing a suitably low shaft speed and high torque, no gearbox is used.

The assembly detailed above is further inserted into chassis 362 and secured using threads on chassis 362 and gearbox retainer 354: The wires from the electric motor 360 are fed through a hole in the chassis 362 and connected to motor driver 166. Electric motor 360 and gearbox 358 have characteristics as described above regarding electric motor 158 and gearbox 156. Motor driver 166 is described above.

In addition, motor driver 166 is disposed inside chassis 362 and is retained in its position by using a reasonably soft and elastic material or potting material 168 as has been disclosed above for the first embodiment. There are many mechanisms for potting and isolating the electronic components from the chasses on which they are mounted. These methods are well known in the art and other version of such mounting mechanisms will not be enumerated. However it can be said in general the severity of the drilling environment dictates the complexity and reliability of such mounting mechanisms.

In addition to the potting material 168, O-rings 224 are also used to provide radial support for the chassis 362 and shaft retainer 352 when they are inserted or installed into electronics housing 310 and ensure that the metallic components of the internal components are not in direct radial contact with the metallic components of the servo housing 110, further aiding in mitigating the damaging effects of vibrations and shock encountered in the drilling environment.

Magnetic coupling outer 350 is attached onto the left hand side of magnetic coupling shaft 356 by means of a compression clamp. This assembly step allows for the magnetic coupling outer 350 to be rotated by the magnetic coupling shaft 356 which in turn is connected to the gearbox 358 and then onto electric motor 360. The electric motor 360 is attached to motor driver 166 through wires and thus, the motor driver 166 can be used to provide the appropriate electrical signals to the electric motor 360 to cause it to rotate as required, whether clockwise or counter-clockwise and at any required speed while providing adequate torque.

Figure 11D:
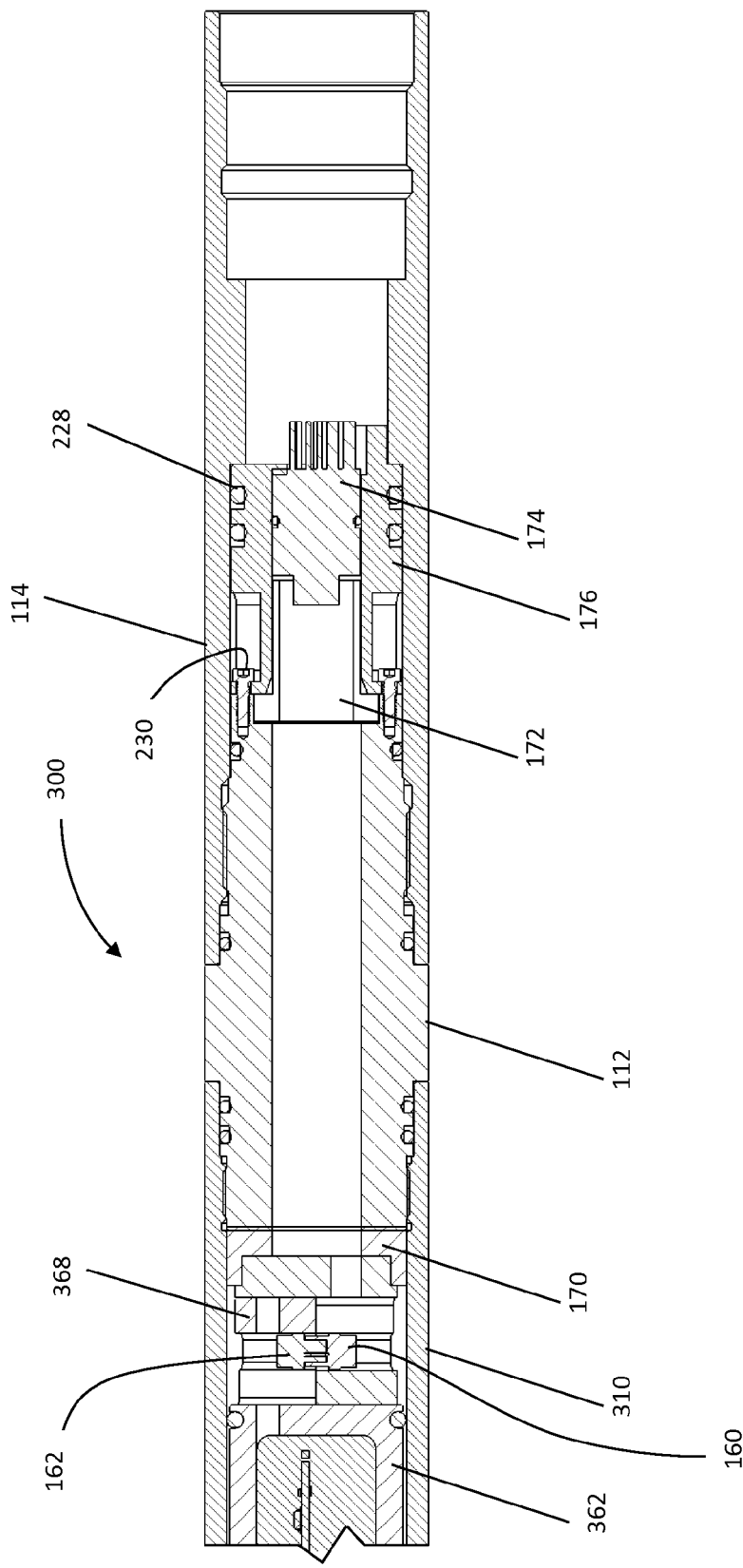

Also with respect to FIG. 11D, connector 162 is mounted onto chassis 362 and is connected by wires (not depicted) to motor driver 166. Connector 160 is mounted onto connector clamp 368. Wires in turn connect connector 160 to connector 174 through a hole in connector clamp 368. The connector clamp assembly thus detailed is mounted onto the chassis 362 in such a manner as to provide electrical contact between connector 160 and connector 162 and thus allow any electrical signals present at connector 174 to be transmitted to motor driver 166. Connector 174 preferably incorporates an O-ring 228 which allows the connector 174 to be seal the internal components of the servo pulser 300 from the drilling environment when allowing it to be mated to other connectors external to servo pulser 300 as appropriate.

The assembly thus detailed is attached to coupling spacer 366 which is then mounted onto magnetic bulkhead 308 in such a manner as to align the axial location of magnetic coupling outer 350 with the magnetic coupling inner 338 thereby allowing any rotation of the magnetic coupling outer 350 to be transferred to magnetic coupling inner 338 thereby allowing any rotation of electric motor 360 to be transmitted through gearbox 358, then through the magnetic coupling outer 350 and thereby through magnetic coupling inner 338 and further through intermediate drive shaft 334 and then to the input shaft of dual shaft gearbox 322 and further through the output shaft of dual shaft gearbox 322. This rotation motion is then continued onto to shaft coupling 314 and then through to servo drive shaft 312 and finally onto servo shaft 126 which is made to oscillate between the Open and Closed positions of the servo Valve as shown in FIGS. 6A and 6B.

FIG. 16 shows a partially exploded three dimensional view of parts of servo pulser 300 wherein the sealing and drive mechanisms, the electromechanical drive mechanisms and the assembly and mounting mechanisms are shown in a partially assembled form. The partially assembled electromechanical drive components described previously and shown in FIG. 15 are mounted onto the mechanical drive components previously described and shown in their assembled form in FIG. 14. Electronics housing 310 is then slipped over the assembly thus described at attached to magnetic bulkhead 308 by means of threads on the electronics housing 310 and magnetic bulkhead 308.

Compression gasket 170 is inserted into electronics housing 310 and the interconnect bulkhead 112 is then threaded onto electronics housing 310. This causes the compression gasket to be retained between the right hand edge of the connector clamp 368 and the left hand edge of the interconnect bulkhead 112 and compressed slightly due to the act of tightening the threads between electronics housing 310 and interconnect bulkhead 112. The compression gasket 170 is preferably made of a reasonably soft but compliant material such as rubber or plastic so as to cause the electromechanical components inside electronics housing 310 to be held in compression and thus restrict the ability of the components inside electronics housing 310 from moving due to shock and vibration loads imparted to the MWD tool 10.

Connector 174 is mounted inside connector retainer 176 and retained in place against axial travel by the use of split rings 172 and retained against rotation by a keyway machined onto connector retainer 176. The connector retainer is mounted onto interconnect bulkhead using screws 230 and as a final assembly step. Interconnect housing 114 is installed over said connector retainer 176 and threaded onto interconnect bulkhead 112.

At this juncture, also with respect to FIGS. 10, 11A and 14, the components comprising the servo valve 101 of said servo pulser 300 can be mounted onto the left of the assembly shown in FIG. 16. Servo shaft 126 is attached with the compliant member 133 disposed inside hole 125 adjacent the end of servo drive shaft 312. Servo seat retainer 120 is mounted inside servo screen housing 102 and screens 104 are installed on servo screen housing 102.

With respect to a method of using an embodiment of the invention as described above, an MWD tool 10 is described that is capable of measuring desired parameters at the bottom of a borehole during the process of drilling, at when desired, is able to telemeter this information to the surface from such a subsurface location using a series of pressure pulses in the drilling fluid where the pressure pulses thus telemetered encode data about these desired parameters which are then subsequently measured at the surface location, detected, decoded and the telemetered information is retrieved, stored, displayed or transmitted further as required.

The MWD tool 10 as described above and with respect to FIGS. 1A and 2 consists of an electrical power source 54 coupled to a controller 56. The controller 56 is attached to a single or a plurality of sensor packages 58 which are used to measure pertinent information at the sub surface location as needed. The MWD tool 10 also consists of a servo pulser 64 (two embodiments of which are described in more detail in either embodiment 100 or embodiment 300). The controller is also attached to a vibration and rotation sensitive switch 60. This is then attached to a mechanical pulse generating valve called a pulser 62. A pulser 62 creates a pressure pulse in the internal drilling fluid column 13 in response to the pressure pulse caused by the servo pulser 64, to which it is ordinarily mechanically coupled at the end of servo screen housing 102.

The process of commanding the MWD tool 10 to make a measurement of desired parameters and then initiate the telemetry of data may be initiated from the surface. When desired and while in the middle or a drilling process, the driller may transmit a command to the MWD tool 10 by first stopping the rotation of drill string 30 and then upon the lifting of the drill bit 34 from the bottom of the well bore 12 by a few feet, stop the circulation of fluid through the drill string 30 by turning off the circulation of fluid by mud pump 38.

Upon these steps, the drill string 30 and the MWD tool 10 attached to it through drill collars 32 will cease to rotate and move. The driller may at this time wait for a predetermined amount of time to allow the MWD tool 10 to detect the absence of said rotation and vibration and in addition detect the lack of vibrations induced by the flow of fluid past the MWD tool 10.

Upon detection of the lack of vibration and rotation, and upon receiving said signal from the vibration and rotation sensitive switch 60, controller 56 may initiate the process of acquiring any pertinent data from the attached sensor package 58 and prepare this data by encoding it into a format suitable for telemetry through mud pulses. These measurements may include, but are not limited to data indicating the orientation of the MWD tool 10 relative the surface location as pertains to its inclination, direction (azimuth), rotational orientation (toolface) or other physical parameters of interest such as the temperature of the subsurface location, the pressure at the subsurface location, and may further include data pertaining to the geophysical nature of the borehole environment, including the radiation levels, resistivity, porosity or other data that may be pertinent to the effective drilling of the borehole.

At the surface, when the predetermined time has elapsed, the driller may initiate fluid flow through the MWD tool 10 by starting the mud pump 38. The driller may or may not initiate rotation at this point as desired and the MWD tool 10 may transmit varying information depending on the presence or absence of rotation while the fluid flow is on.

The vibration and rotation sensitive flow switch 60 detects the initiation of fluid flow past the MWD tool 10 and may detect the initiation of rotation of the drill string 30 if any such rotation was initiated at the surface. It then signals such information to the controller 56 which in turn waits a predetermined amount of time to allow for the stabilization of fluid flow and the establishment of proper pressures.

When this predetermined delay time has elapsed, the controller 56 may initiate the start of transmission of data to the surface by signaling the servo pulser 64 to operate.

Upon receiving that signal, servo pulser 64 may initiate a sequence of opening and closing movements by oscillating the servo shaft 126 between an open position and a closed position. Each such open and closing even may be treated as a pair and indicate a pressure pulse of a known width and the allowance of fluid flow through the servo pulser 64 during these open times causes the pulser 62 to engage and close a large valve which in turn restricts fluid flow through the MWD tool 10 and creates a pressure pulse in the fluid column.

Upon receiving that signal, in another embodiment, servo pulser 64 may operate by rotating servo valve 101 between two, or more, rotational orientations. A first orientation may be one in which a passageway for fluid, such as servo holes 124, is substantially obstructed, and a second rotational orientation may be one in which they are substantially unobstructed. In other embodiments, the first orientation may include sealing the fluid passageway, or additional orientations. Sealing a fluid passageway may include rotating servo shaft 126 to such a first orientation by rotating the input end of servo valve 101. In one embodiment, rotating servo shaft 126 rotates a portion thereof to obstruct a one or more fluid passageways. That portion may include one or more tips extending axially from the obstructing portion. Substantially obstructing a fluid passageway may include rotating rotating the input end of servo valve 101 to rotate one or more tips 128 to seal servo holes 124.

Servo valve 101 may stop rotation of the servo pulser 64 at one or more orientations by a part of the servo pulser 64 contacting stopping structures. These structures may be in a fixed rotational orientation to fluid passages in servo pulser 64. In one embodiment, the structures are indirect contact with servo seat 122 and are in a fixed rotational orientation to servo holes 124 in servo seat 122. In one embodiment, rotation is stopped by servo shaft 126 contacting mechanical stops 121. Rotation of servo shaft 126 may be stopped by radially-extending portions thereof contacting a structure located radially outward of servo seat 122. Rotation of servo shaft 126 may be stopped by one or more portions thereof contacting an extension of a structure in contact with the servo seat 122, one example of which are mechanical stops 121.

The width and the frequency of such opening and closing event pairs can be used to create pulses in the fluid flow whereby these pressure pulses can be used to encode information. As an example, the opening and closing of the servo valve 101 and thereby the pulser 62 can be used to create a distinct pattern of pressure pulses which indicate the start of telemetry.

In addition, the width of the pulse thus generated, the time between said pulses and their position relative to each other can be used to encode data in a purely analog or in a digital format. For example, an analog transmission method might employ the time between two adjacent pulses to encode a meaningful piece of information where in the greater the delay between said pulse, the larger the value of the information thus transmitted. An example of a digital encoding mechanism may be to allow a single pulse to exist in a finite number of positions and if a pulse exists in one such position, the value thus transmitted is equal to the value previously assigned to such position.

This allows for a method of transmitting data where with relative ease, the width, location and pattern of said pressure pulses can be adjusted to encode data in varying formats.

One method that may be used in an MWD tool is to continue the telemetry of data for long periods of time after the initiation of fluid flow through the MWD tool by allowing the MWD tool to acquire pertinent data from the sensor package 58 either continuously or at preset intervals and then encode and transmit this data to the surface at fixed intervals.

Another method that may be used in an MWD tool is to allow the transmission of information to cease when all data that is required to be telemetered has been sent. As a consequence of this method, it is intended that the inverse of this, that is the start of telemetry of data can also be initiated when the controller 56 detects a specific event downhole. Such an event may be the occurrence of a specific time interval or a multiple of said time interval which would indicate that the controller can acquire new data from the sensor package 58 and telemeter that data to the surface. Such an event could also be generated by the controller 56 detecting that a pertinent data value is above a threshold, below a threshold or at a threshold by continuing to acquire data from the sensor package 58, and when such an event occurs cause the start of telemetry to occur and consequently encode any data to be sent and signal to servo pulser to open and close as required to transmit such data to the surface.

As said previously, the presence or absence of rotation can also be used to trigger an event and initiate, terminate or modify the telemetry of data by the MWD tool 10. As an example, the change of the state of rotation of the drill string from rotating to not rotating can be used to trigger an event that changes the values being telemetered to the surface by the MWD tool 10.

Thus it is to be understood that the invention is not limited in this application to the details of construction and to the arrangements of the components set forth in the description or claims or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

The invention claimed is:

1. A rotary servo valve for actuating a mud pulser in a drilling fluid column, comprising:
   a servo valve seat defining one or more drilling fluid passageways therethrough;
   the rotary servo valve being capable of operating in at least two rotational positions, including a first rotational position in which the rotary servo valve blocks said one or more drilling fluid passageways; and
   at least one rotational stop defining one of said rotational positions;
   said at least one rotational stop positioned wholly radially outward of said valve seat;

said at least one rotational stop being an extension of a retaining structure for said valve seat;
said at least one rotational stop indirectly contacting said valve seat and being in a fixed rotational orientation thereto; and an obstructing portion comprising two or more tips extending axially from said obstructing portion toward the servo valve seat.

2. The rotary servo valve of claim 1,
further comprising a servo shaft;
said servo shaft comprising a shaft body and said obstructing portion; and
each of said one or more rotational positions defining a rotational orientation of said servo shaft.

3. The rotary servo valve of claim 1,
wherein a substantial portion of said obstructing portion does not contact said servo valve seat.

4. The rotary servo valve of claim 2,
said tips formed of a more wear-resistant material than said shaft body.

5. The rotary servo valve of claim 4,
said more wear-resistant material being a carbide.

6. The rotary servo valve of claim 1,
said two or more tips attached to said obstructing portion by a manufacturing process.

7. The rotary servo valve of claim 2,
wherein the obstructing portion of the servo shaft is located off an axis of rotation of the servo shaft.

8. The rotary servo valve of claim 7,
wherein said servo shaft is mounted to said servo valve seat at said axis of rotation.

9. The rotary servo valve of claim 1,
said one or more drilling fluid passageways comprising at least one hole passing through the servo valve seat.

10. The rotary servo valve of claim 9,
said at least one hole connecting a drilling fluid column side and a pulser side.

11. The rotary servo valve of claim 1,
wherein said rotary servo valve is configured for installation in a servo pulser.

12. The rotary servo valve of claim 11,
wherein said servo valve seat is configured for mounting to a pulser servo screen housing.

13. The rotary servo valve of claim 11,
further comprising a servo shaft;
wherein said servo shaft is configured for attachment to a drive shaft.

14. The rotary servo valve of claim 1,
wherein said servo valve is adapted to expose a first side to drilling mud in communication with said drilling fluid column and a second side to drilling mud in communication with said mud pulser.

15. The rotary servo valve of claim 1,
said one or more drilling fluid passageways comprising at least two holes passing through the servo valve seat;
wherein said at least two holes are located symmetrically with respect to an axis of rotation of said rotational positions.

16. The rotary servo valve of claim 15,
further comprising a servo shaft comprising said obstructing portion;
said servo shaft further comprising at least two portions extending transversely symmetrically with respect to said axis of rotation.

17. The rotary servo valve of claim 16,
said tips extending a fixed distance from each of said at least two extending portions;
wherein said tips seal said holes in said first rotational position.

18. The rotary servo valve of claim 15
said obstructing portion further comprising at least two portions extending transversely symmetrically from said axis of rotation; and
wherein said tips are compressed against said servo valve seat; and
said tips extending axially to contact said servo valve seat from said extending portions.

19. The rotary servo valve of claim 1,
said one or more drilling fluid passageways comprising two holes passing through the servo valve seat;
said holes being substantially circular in cross-section;
said holes being separated, center-to-center, by about three times a diameter of said holes.

20. The rotary servo valve of claim 19,
said servo valve seat having a face being substantially circular in cross-section;
a diameter of said face being about five times the said diameter of said hole.

21. The rotary servo valve of claim 1,
further comprising an axis of rotation;
said one or more drilling fluid passageways comprising two ¼-inch diameter holes passing through the servo valve seat;
said holes being located symmetrically off said axis of rotation at a center-to-center distance of about ¾ inch.

22. The rotary servo valve of claim 1,
said servo valve seat further comprising a cross-sectional area; and
said one or more drilling fluid passageways comprising at least about 3% of said cross-sectional area.

23. The rotary servo valve of claim 22,
said one or more drilling fluid passageways comprising at least about 5% of said cross-sectional area.

24. The rotary servo valve of claim 22,
said one or more drilling fluid passageways comprising at least about 8% of said cross-sectional area.

25. The rotary servo valve of claim 1,
wherein said obstructing portion maintains substantially the same distance from said servo valve seat in each of said at least two rotational positions.

26. A rotary servo valve for actuating a mud pulser in a drilling fluid column, comprising:
a servo valve seat with a fluid passageway between a first and a second side thereof;
a servo shaft comprising a shaft body, and at least two portions extending transversely from said shaft body symmetrically with respect to an axis of rotation of said body;
each of said extending portions comprising a tip;
wherein each of said tips extends axially therefrom toward said fluid passageway and contacts said first side;
said servo shaft being capable of at least two rotational orientations, including a first rotational orientation in which the servo shaft substantially obstructs said fluid passageway, and a second rotational orientation in which the fluid passageway is substantially unobstructed; and
at least one rotational stop defining one of said rotational orientations by contact with one of said at least two extending portions.

27. The rotary servo valve of claim 26,
comprising two rotational stops, each defining one of said rotational orientations.

28. The rotary servo valve of claim 27,
further comprising a retainer for said servo valve seat; and
said retainer comprising extensions forming said rotational stops.
29. The rotary servo valve of claim 26,
said one or more rotational stops being radially outward of said servo valve seat.
30. The rotary servo valve of claim 26,
said fluid passageway comprising at least two holes passing through the servo valve seat; and
said at least two extending portions substantially rotationally aligned with said at least two holes in said first orientation.
31. The rotary servo valve of claim 26,
said tips attached to said shaft body by a manufacturing process.
32. The rotary servo valve of claim 26,
wherein said servo shaft contacts said first side only at said tips.
33. The rotary servo valve of claim 26,
said fluid passageway comprising at least one hole connecting a drilling fluid column side and a pulser side.
34. The rotary servo valve of claim 26,
wherein said rotary servo valve is configured for installation in a servo pulser.
35. The rotary servo valve of claim 26,
wherein said servo shaft seals said fluid passages in said first rotational orientation.
36. A rotary servo valve for actuating a mud pulser in a drilling fluid column, comprising:
a servo valve seat with a fluid passageway therethrough;
a servo shaft comprising
a shaft body having an axis of rotation and a diameter;
at least one lateral extension extending away from said shaft body substantially transversely to said axis;
said at least one lateral extension extending substantially radially outward of said diameter;
said lateral extension comprising at least one tip extending axially a fixed distance therefrom toward said fluid passageway; and
wherein said servo shaft has at least a first rotational orientation in which the lateral extension substantially obstructs said fluid passageway, and a second rotational orientation in which the fluid passageway is substantially unobstructed; and
at least one rotational stop defining one of said orientations by being in contact with said lateral extension.
37. The rotary servo valve of claim 36,
said at least one rotational stop indirectly contacting said servo valve seat and being in a fixed rotational orientation thereto.
38. The rotary servo valve of claim 36,
said one or more rotational stops being radially outward of said servo valve seat.
39. The rotary servo valve of claim 36,
said fluid passageway comprising at least two holes passing through the servo valve seat;
said lateral extension comprising at least two tips extending axially therefrom toward said fluid passageway, said tips substantially rotationally aligned with said at least two holes in said first orientation.
40. The rotary servo valve of claim 36,
wherein said at least one tip seals said fluid passageway in said first rotational position.
41. The rotary servo valve of claim 36,
said at least one tip attached to said shaft body by a manufacturing process.
42. The rotary servo valve of claim 36,
said at least one lateral extension comprising at least two lateral portions.
43. The rotary servo valve of claim 42,
said lateral portions each comprising at least one tip.
44. The rotary servo valve of claim 36,
wherein said servo shaft contacts said servo valve seat only at said at least one tip.
45. The rotary servo valve of claim 36,
said rotary servo valve being configured for installation in a servo pulser.
46. The rotary servo valve of claim 36,
wherein said rotary servo valve is adapted to expose said first side to drilling mud in communication with said drilling fluid column and said second side to drilling mud in communication with said mud pulser.
47. A servo pulser for actuating a mud pulser, comprising:
a drilling fluid column side and a pulser side; and
a rotary servo valve;
said rotary servo valve comprising
at least one fluid passageway between said sides;
a servo shaft comprising
a shaft body; and
at least one substantially radially extending lateral extension from said shaft body;
said lateral extension comprising one or more servo tips extending axially therefrom toward said at least one fluid passageway; and
at least one rotational stop;
said stop in a fixed rotational orientation to said rotary servo valve; and
said stop radially outward of said at least one fluid passageway;
wherein the servo pulser is configured to expose said pulser side to drilling mud in communication with a mud pulser.
48. The servo pulser of claim 47, further comprising:
a hydrostatically-compensated volume containing a gearbox; and
a motor in an air-filled volume.
49. The servo pulser of claim 48,
wherein said gearbox operatively connects said motor to said rotary servo valve.
50. The servo pulser of claim 48,
further comprising a magnetically transparent pressure barrier between the motor and the rotary servo valve.
51. The servo pulser of claim 48,
further comprising a magnetic torque coupler;
wherein said magnetic torque coupler operatively connects the motor and the rotary servo valve.
52. The servo pulser of claim 48,
the hydrostatically-compensated section comprising a magnetically transparent pressure barrier; and
further comprising a magnetic torque coupler spanning the magnetically transparent pressure barrier.
53. The servo pulser of claim 52,
said magnetic torque coupler operatively connecting the motor and the rotary servo valve.
54. The servo pulser of claim 48,
said motor comprising an electric motor.
55. The servo pulser of claim 48,
said rotary servo valve comprising a valve seat;
wherein said valve seat and said servo shaft are substantially constrained from translating with regard to each other.

56. The servo pulser of claim 47,
said rotary servo valve further comprising
a rotational position in which the rotary servo valve substantially obstructs said fluid passageway.

57. The servo pulser of claim 56,
wherein said one or more servo tips substantially obstruct said fluid passageway in said rotational position.

58. The servo pulser of claim 47,
said rotary servo valve further comprising
at least two rotational positions;
said at least one rotational stop defining at least one of said rotational positions.

59. The servo pulser of claim 58,
said rotary servo valve further comprising a servo valve seat; and
said at least one rotational stop being in a fixed rotational orientation to said servo valve seat.

60. The rotary servo valve of claim 58,
said at least one rotational stop defining said one of said rotational positions by being in contact with said servo shaft.

61. The servo pulser of claim 58,
said servo tips extending axially to contact said servo valve seat.

62. The servo pulser of claim 47, further comprising:
a magnetic torque coupler operatively connected to the rotary servo valve.

63. The servo pulser of claim 62, further comprising:
a motor; and
a hydrostatically-compensated volume containing a gearbox;
said gearbox operatively connecting the motor to the rotary servo valve.

64. The servo pulser of claim 62, further comprising:
a motor; and
further comprising a magnetically transparent pressure barrier between the motor and the rotary servo valve.

65. The servo pulser of claim 64,
said motor in an air-filled volume; and
said magnetic torque coupler spanning the magnetically transparent pressure barrier.

66. The servo pulser of claim 47,
said servo tips extending axially a fixed distance.

67. The servo pulser of claim 47,
said at least one rotational stop defining a rotational orientation of said servo shaft by contact with said at least one lateral extension.

68. A method for actuating a mud pulser in a drilling fluid column using pressure pulses in a fluid flow, comprising the steps of:
rotating an input end of a servo pulser between a first rotational position and a second rotational position;
said servo pulser comprising a servo shaft having one or more tips extending axially from one or more lateral extensions of said servo shaft; and
substantially obstructing a fluid passageway fluidically connected to said drilling fluid between a first and a second side of said servo pulser in said first rotational position;
stopping rotation at at least one of said rotational positions at a rotational stop;
stopping rotation by contacting one of said lateral extensions to said rotational stop; and
creating one of said pressure pulses in said drilling fluid column.

69. The method of claim 68,
said obstructing step further comprising sealing said passageway in said first rotational position.

70. The method of claim 69,
said obstructing step further comprising said one or more tips sealing said passageway.

71. The method of claim 68,
said servo pulser further comprising a motor; and
said rotating step further comprising a magnetic torque coupler transmitting torque from the motor to the rotary servo valve.

72. The servo pulser of claim 68,
said servo pulser further comprising a hydrostatically-compensated volume containing a gearbox;
said rotating step further comprising transmitting torque from the magnetic torque coupler to said gearbox.

73. A method for actuating a mud pulser in a drilling fluid column using pressure pulses in a fluid flow, comprising the steps of:
rotating an input end of a servo pulser between a first rotational position and a second rotational position;
said servo pulser comprising a servo shaft having one or more tips extending axially from one or more lateral extensions of said servo shaft; and
substantially obstructing a fluid passageway fluidically connected to said drilling fluid between a first and a second side of said servo pulser in said first rotational position;
stopping rotation at at least one of said rotational positions at a rotational stop;
said servo pulser further comprising a valve seat;
wherein said at least one rotational stop indirectly contacts said valve seat and is in a fixed rotational orientation thereto;
said at least one rotational stop being wholly radially outward of said valve seat; and
creating one of said pressure pulses in said drilling fluid column.

74. The method of claim 73,
said servo shaft further comprising a shaft body, and
wherein said one or more lateral extensions extend substantially radially outwardly of said shaft body.

75. A servo pulser for actuating a mud pulser, comprising:
a rotary servo valve;
said rotary servo valve comprising;
a valve seat;
said valve seat rotationally-fixed within said rotary servo valve;
a fluid passageway configured to communicate with a mud pulser;
at least two rotational positions; and
at least one rotational stop indirectly in contact with said valve seat and in a fixed rotational orientation thereto;
said at least one rotational stop defining at least one of said rotational positions;
said rotary servo valve further comprising a retainer for said valve seat; and
said retainer comprising at least one extension forming said at least one rotational stop.

76. The servo pulser of claim 75, further comprising:
a hydrostatically-compensated volume containing a gearbox; and
a motor;
said gearbox operatively connecting the motor to the rotary servo valve.

77. The servo pulser of claim 75, further comprising:
a motor in an air-filled volume; and
a magnetic torque coupler operatively connecting the motor to the rotary servo valve.

78. The servo pulser of claim 75,
further comprising a servo shaft comprising at least one substantially radially extending lateral extension;
said lateral extension comprising at least one servo tip extending axially therefrom to contact said valve seat.

79. The servo pulser of claim 78,
said at least one rotational stop defining said at least one of said rotational positions by being in contact with said servo shaft.

80. The servo pulser of claim 78,
wherein said valve seat and said servo shaft are substantially constrained from translating with regard to each other.

81. The servo pulser of claim 75, further comprising
a shaft body forming at least two transversely extending portions; and
a servo tip extending axially from each said extending portion toward said valve seat.

82. The servo pulser of claim 81,
wherein said servo tips are compressed against said valve seat.

83. A method for actuating a mud pulser in a drilling fluid column using pressure pulses in a fluid flow, comprising the steps of:
rotating an input end of a servo pulser between a first rotational position and a second rotational position;
said servo pulser comprising a servo shaft having one or more tips extending axially from one or more lateral extensions of said servo shaft; and
stopping rotation at at least one of said rotational positions at a rotational stop;
substantially obstructing a fluid passageway fluidically connected to said drilling fluid between a first and a second side of said servo pulser in said first rotational position;
said servo pulser further comprising a valve seat and a retainer for said valve seat;
said retainer comprising an extension forming said rotational stop; and
creating one of said pressure pulses in said drilling fluid column.

84. The method of claim 83,
wherein said rotational stop indirectly contacts said valve seat and is in a fixed rotational orientation thereto.

85. The method of claim 83,
the rotating step comprising said one or more tips sweeping across a face of the valve seat.

86. A method for actuating a mud pulser using pressure pulses in a fluid flow, comprising the steps of:
rotating an obstructing portion of a servo pulser between a first rotational position and a second rotational position;
said servo pulser comprising a valve seat and at least one rotational stop indirectly contacting said valve seat and being in a fixed rotational orientation thereto; and the obstructing portion comprising two or more tips extending axially from said portion toward the valve seat,
said at least one rotational stop being an extension of a retaining structure for said valve seat and being positioned wholly radially outward of said valve seat;
stopping rotation of said obstructing portion at at least one of said rotational orientations at the at least one rotational stop; and
substantially obstructing a fluid passageway between a first and a second side of said servo pulser in said first rotational position.

87. The method of claim 86,
said servo pulser further comprising a motor; and
said rotating step further comprising a magnetic torque coupler transmitting torque from the motor to the rotary servo valve.

88. The servo pulser of claim 86,
said servo pulser further comprising a hydrostatically-compensated volume containing a gearbox;
said rotating step further comprising transmitting torque from the magnetic torque coupler to said gearbox.

89. The method of claim 86,
said obstructing portion comprising one or more lateral extensions having at least one tip extending axially therefrom.

90. The method of claim 89,
the substantially obstructing step comprising said at least one tip obstructing a fluid passage in said valve seat.

91. The method of claim 89,
the rotating step comprising said at least one tip sweeping across a face of the valve seat.

* * * * *